United States Patent
Sakurai et al.

(10) Patent No.: US 11,583,375 B2
(45) Date of Patent: Feb. 21, 2023

(54) PARTIAL CONNECTION FULL ARCH ARTIFICIAL TOOTH HAVING ADJUSTABILITY OF DENTAL ARCH AND OCCLUSION CURVATURE

(71) Applicant: KABUSHIKI KAISHA SHOFU, Kyoto (JP)

(72) Inventors: Kaoru Sakurai, Tokyo (JP); Hirokazu Sato, Kyoto (JP); Kunihiro Fujii, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 2 days.

(21) Appl. No.: 17/374,512

(22) Filed: Jul. 13, 2021

(65) Prior Publication Data

US 2022/0015880 A1 Jan. 20, 2022

(30) Foreign Application Priority Data

Jul. 14, 2020 (JP) .............................. JP2020-120314
May 18, 2021 (JP) .............................. JP2021-084026

(51) Int. Cl.
*A61C 13/097* (2006.01)
*A61C 13/01* (2006.01)
*A61C 13/08* (2006.01)

(52) U.S. Cl.
CPC ............ *A61C 13/097* (2013.01); *A61C 13/01* (2013.01); *A61C 13/082* (2013.01)

(58) Field of Classification Search
CPC ....... A61C 13/097; A61C 13/08; A61C 13/26; A61C 13/10
See application file for complete search history.

(56) References Cited

U.S. PATENT DOCUMENTS

| 5,501,598 | A  | 3/1996 | Misch |
| 6,508,651 | B1 | 1/2003 | Nakamura et al. |

(Continued)

FOREIGN PATENT DOCUMENTS

| CA | 2416416 A1 * | 7/2004 | .......... A61C 13/097 |
| CN | 1053887 | 8/1991 | |
| DE | 4302491 A1 * | 8/1994 | ............ A61C 13/08 |

(Continued)

OTHER PUBLICATIONS

DE4302491A1 (Mierswa Klaus Dipl Ing) Artificial teeth for upper and lower dental prostheses, Aug. 4, 1994. [retrieved on Nov. 17, 2022], Translation retrieved from: Google Patents (Year: 1994).*

(Continued)

*Primary Examiner* — Amy R Sipp
*Assistant Examiner* — Courtney N Huynh
(74) *Attorney, Agent, or Firm* — Wenderoth, Lind & Ponack, L.L.P.

(57) ABSTRACT

A partial connection full arch artificial connects and fixes in an appropriate occlusal relationship in advance and appropriately defines a region that should be separated and a region that may be standardized, appropriately defines a combination of regions of adjacent surfaces constituting a contact region, an angle of the denture with respect to the virtual occlusal plane, and an area thereof in a region where artificial teeth are brought into contact with each other.

20 Claims, 7 Drawing Sheets

(56) References Cited

U.S. PATENT DOCUMENTS

| | | | | |
|---|---|---|---|---|
| 8,257,082 B2 * | 9/2012 | Kadobayashi | ......... | A61C 13/08 |
| | | | | 433/196 |
| 8,494,241 B2 * | 7/2013 | Kadobayashi | ......... | A61C 19/05 |
| | | | | 382/128 |

FOREIGN PATENT DOCUMENTS

| | | | | |
|---|---|---|---|---|
| JP | 58-180141 | | 10/1983 | |
| JP | 6-261917 | | 9/1994 | |
| JP | 8-80306 | | 3/1996 | |
| JP | 2001-137261 | | 5/2001 | |
| JP | 5001329 | | 5/2012 | |
| JP | 5001329 | | 8/2012 | |
| JP | 2017-176486 | | 10/2017 | |
| KR | 20160085780 A | * | 7/2016 | ........... A61C 13/097 |
| WO | 2012/041329 | | 4/2012 | |

OTHER PUBLICATIONS

KR20160085780A (Jung Daniel Yonil, Jung Benjamin Yunoh) Method of Making a Dental Prosthesis, Jul. 18, 2016. [retrieved on Nov. 17, 2022], Translation retrieved from: Google Patents (Year: 2016).*

Extended European Search Report dated Dec. 8, 2021 in corresponding European Patent Application No. 21185330.4.

Kaoru Sakurai et al., "Color ATRAS No. 47, Geriatric Dentistry Contributing to Extension of Human Health Span, in Light of Cooperation with Various Fields", Shofu Inc., Feb. 2018, pp. 110-117 (with partial English translation).

* cited by examiner

PARTIAL CONNECTION FULL ARCH ARTIFICIAL TOOTH HAVING ADJUSTABILITY OF DENTAL ARCH AND OCCLUSION CURVATURE

CROSS-REFERENCE TO RELATED APPLICATIONS

This application claims priority to Japanese Patent application No. 2020-120314, filed Jul. 14, 2020, and Japanese Patent application No. 2021-084026, filed May 18, 2021, the disclosures of which are incorporated herein by reference in the entirety.

BACKGROUND OF THE INVENTION

Field of the Invention

The present invention relates to a ready-made artificial tooth for use in a plate denture, and in particular, to one for use in fabrication of a denture using CAD/CAM technology.

Description of the Related Art

In the field of prosthetic dentistry for supplementing the form and function of a lost tooth, an artificial tooth is used as a main component to restore the occlusal function mainly when fabrication of a plate denture. In the fabrication of a plate denture by a conventional method, an artificial tooth is planted on a base plate made of wax or a base plate made by combining wax and resin, and then the wax is replaced with a resin such as acrylic.

On the other hand, as shown in Kaoru SAKURAI, "COLOR ATRAS No. 47, Geriatric Dentistry Contributing to Extension of Human Health Span, In Light of Cooperation with Various Fields", Shofu Inc., February 2018, pp. 110 to 117, regarding the ridge form of a patient with a plate denture, it has been difficult to fabricate a large plate denture typified by a complete denture due to the patient's desire to avoid tooth removal as much as possible, in addition to an increase in the number of remaining teeth as a result of 8020 Program, promoted by the Ministry of Health, Labour and Welfare and the Japan Dental Association since 1989. As a result of delaying the tooth removal treatment, the ridge form of these patients has developed to so-called a difficult case where a jawbone is absorbed in a flat or bilge shape, particularly in the mandibular ridge. The greatly absorbed ridge becomes difficult to resist the front, rear, left, and right forces, i.e., lateral stress, generated during mastication, and hence the plate denture is easily removed. In order to prevent rocking of the plate denture in such a ridge form, it is preferable to use an artificial tooth form having a small cusp inclination angle and a small cusp development angle, in which the lateral stress generated during mastication is hardly generated. In a case of a patient with an unstable jaw position or a patient with varied tapping points, if an artificial tooth having an anatomical form with a large cusp development angle is used for intercuspation, the mastication motion is restricted by the artificial tooth, which makes the denture very difficult to use for the patient. In such case, it is effective to use a cuspless tooth having no intercuspation. It is also effective to use a cuspless tooth even in a situation where it is impossible to perform precise bite taking such as that performed in a medical examination room for a person requiring nursing care. However, dental colleges in Japan do not provide dental students with detailed education on complete denture treatment using cuspless teeth. The conventionally provided cuspless tooth is a single tooth where each tooth is independent. A complicated operation is performed for conforming the occlusal surface of the molar to the occlusal plane so as not to generate a gap.

In recent years, a method of designing a denture with a computer using CAD/CAM technology has been commercialized. The CAD/CAM method adopts a method in which after the entire denture shape is designed, the data of the denture base excluding the part where the artificial tooth is embedded is output to an NC processing machine or a 3D printer, only the denture base is fabricated by means such as cutting or additive fabrication, and after that, a ready-made artificial tooth is bonded to the artificial tooth embed part by using an adhesive or the like. However, the current denture design process (CAD) is a computerized version of the complicated denture design technique that has been performed in the conventional technical method. More specifically, similarly to the conventional fabrication method, an anatomical index that serves as a reference for determining the arrangement position of the artificial tooth is indicated according to the shape of individual patient's ridge shape, the shape and size of the artificial tooth is selected, and the arrangement position and the occlusal contact relationship are adjusted by the computer so that the appropriate occlusal relationship is reproduced for each temporarily arranged artificial tooth. This is work that depends largely on the experience and skill of the operator in terms of both fabrication efficiency and the quality of the denture. In a case where the design of a denture is completed despite the inappropriate arrangement state, it is extremely difficult to appropriately utilize the characteristics of the form of an artificial tooth and fabricate a highly functional denture, such as performing extensive grinding adjustment after completion of the denture.

As for the denture fabrication process (CAM), a part of the process can be automatically fabricated by introducing cutting with a milling machine or an additive fabrication with a 3D printer, thereby reducing the burden of conventional fabrication process such as manually curing of denture base resin. However, as an overall result, as mentioned above, the disadvantage of manually performing outweighs the advantage of the automated fabrication process (CAM), including a number of complicated operations and fixations such as artificial tooth arrangement in the design stage (CAD) with the computer, as well as a burden of correcting an error in the occlusal relationship caused by the adhesion operation of the denture base and the artificial tooth as the post-treatment of the processed denture. Therefore, the labor saving of the denture fabrication process, which is originally expected in the CAD/CAM technology, has not actually been achieved.

International publication No. 2012/041329 discloses an example of a denture fabrication method using the CAD/CAM. International publication No. 2012/041329 discloses a method for modeling and manufacturing a denture including a gingival part and artificial teeth. The method disclosed in International publication No. 2012/041329 includes: providing a 3D scan including at least part of the patient's oral cavity; virtually modeling at least part of the denture using the 3D scan; obtaining virtual teeth to represent the artificial teeth; virtually modeling at least one of the virtual teeth to obtain a set of modeled virtual teeth; manufacturing the modeled virtual teeth in a first material; manufacturing the gingival part in a second material; and manufacturing at least part of the denture by means of computer aided manufacturing (CAM).

JP S58-180141 A discloses a unit artificial tooth characterized in that, in order to simplify the arrangement operation of the artificial tooth, the adjacent surface or the base surface is connected by a flexible connection material, and firmly fixed by means such as photopolymerization after the attachment of the artificial tooth.

JP H6-261917 A discloses a denture connecting tooth for a temporary prosthesis of a denture or an implant. In the denture connecting tooth described in JP H6-261917 A, a plurality of artificial teeth is connected by a connecting material, and similarly to JP S58-180141 A, the plurality of artificial teeth can be arranged collectively when the artificial tooth is fixed to the denture base.

JP H8-80306 A discloses a movable connecting artificial tooth. The movable connecting artificial tooth described in JP H8-80306 A includes all the individually formed artificial teeth of the upper jaw or the lower jaw, and a bonding material that is capable of aligning all the artificial teeth in a fixed dentition, and moving the individual artificial teeth from the dentition, and has plasticity that stops the artificial teeth in the moved position.

JP 2001-137261 A discloses an artificial tooth set of a molar in which artificial teeth corresponding to a maxillary second premolar and a maxillary first molar are connected and fixed, and an occlusal surface and an occlusal plane and an opposing contact region are defined.

JP 2017-176486 A discloses a coupled artificial tooth row formed by coupling a plurality of artificial teeth used for an upper structure of an implant prosthetic device.

SUMMARY OF THE INVENTION

The problem to be solved by the present invention is to efficiently fabricate in a short time a denture having an aesthetic and good occlusal relationship in harmony with mastication motion, perioral tissues, and complexion of various patients.

A partial connection full arch artificial tooth of an aspect of the present invention is a partial connection full arch artificial tooth (100) having adjustability of dental arch and occlusion curvature, including:
a maxillary partial connection full arch artificial tooth (U1); and
a mandibular partial connection full arch artificial tooth (L1), in which
the maxillary partial connection full arch artificial tooth (U1) has
  a maxillary anterior tooth group artificial tooth (10U) in which eight teeth of maxillary central incisors (1U), maxillary lateral incisors (2U), maxillary canines (3U), and maxillary first premolars (4U) that are arranged on both right and left sides are connected and fixed in a center of the maxillary partial connection full arch artificial tooth (U1), and
  a maxillary occlusal center group artificial tooth (20U) in which two teeth of a maxillary second premolar (5U) and a maxillary first molar (6U) are connected and fixed and connected to the maxillary anterior tooth group artificial tooth (10U) in each of a right side and a left side of the maxillary partial connection full arch artificial tooth (U1),
the maxillary partial connection full arch artificial tooth (U1) is configured such that an artificial tooth (30U) of a maxillary single tooth including a maxillary second molar (7U) can be connected to the maxillary occlusal center group artificial tooth (20U) in each of a right side and a left side of the maxillary partial connection full arch artificial tooth (U1), the mandibular partial connection full arch artificial tooth (L1) has
  a mandibular anterior tooth group artificial tooth (10L) in which eight teeth of mandibular central incisors (1L), mandibular lateral incisors (2L), mandibular canines (3L), and mandibular first premolars (4L) that are arranged on both right and left sides are connected and fixed in a center of the mandibular partial connection full arch artificial tooth (L1), and
  a mandibular occlusal center group artificial tooth (20L) in which two teeth of a mandibular second premolar (5L) and a mandibular first molar (6L) are connected and fixed and connected to the mandibular anterior tooth group artificial tooth (10L) in each of a right side and a left side of the mandibular partial connection full arch artificial tooth (L1),
the mandibular partial connection full arch artificial tooth (L1) is configured such that an artificial tooth (30L) of a mandibular single tooth including a mandibular second molar (7L) can be connected to the mandibular occlusal center group artificial tooth (20L) in each of a right side and a left side of the mandibular partial connection full arch artificial tooth (L1),
a distal surface (4$d$U) of the maxillary first premolar (4U) is provided with a region including two pillar surfaces having different angles intersecting a virtual occlusal plane (P1) of a denture on each of an occlusal surface side and a basal surface side,
a mesial surface (5$m$U) of the maxillary second premolar (5U) is provided with a region including a single pillar surface that is orthogonal to a plane (P2U) including three points of a buccal cusp tip and a lingual cusp tip of a maxillary second premolar (5U) and a mesial lingual cusp tip of a maxillary first molar (6U) in a case of a cuspidate form, and orthogonal to an occlusal surface (P2'U) of the maxillary second premolar (5U) and the maxillary first molar (6U) in a case of a cuspless form,
any one of a pillar surface on an occlusal surface side and a pillar surface on a basal surface side of the distal surface (4$d$U) of the maxillary first premolar (4U) forms a contact region in contact with a pillar surface of a mesial surface (5$m$U) of the maxillary second premolar (5U),
a distal surface (4$d$L) of the mandibular first premolar (4L) is provided with a region including two pillar surfaces having different angles intersecting a virtual occlusal plane (P1L) of a denture on each of an occlusal surface side and a basal surface side,
a mesial surface (5$m$L) of the mandibular second premolar (5L) is provided with a region including a single pillar surface that is orthogonal to a plane (P2L) including three points of a buccal cusp tip and a lingual cusp tip of the mandibular second premolar (5L) and a mesial lingual cusp tip of the mandibular first molar (6L) in a case of a cuspidate form, and orthogonal to an occlusal surface (P2'L) of the mandibular second premolar (5L) and the mandibular first molar (6L) in a case of a cuspless form,
any one of a pillar surface on an occlusal surface side and a pillar surface on a basal surface side of the distal surface (4$d$L) of the mandibular first premolar (4L) forms a contact region in contact with a pillar surface of a mesial surface (5$m$L) of the mandibular second premolar (5L),
when a first contact region (f1) is formed in the maxillary partial connection full arch artificial tooth (U1) by a pillar surface on an occlusal surface side of the distal surface (4$d$U) of the maxillary first premolar (4U) and a pillar surface of the mesial surface (5mU) of the maxillary second premolar (5U) coming into contact with each other, a second contact region (f2) is formed in the mandibular partial connection full arch artificial tooth (L1) by a pillar surface on a basal surface side of the distal surface (4dL) of the mandibular first premolar (4L) and a pillar surface of a mesial surface (5mL) of the mandibular second premolar (5L) coming into contact with each other, and when a third contact region (f3) is formed in the maxillary partial connection full arch artificial tooth (U1) by a pillar surface on a basal surface side of the distal surface (4dU) of the maxillary first premolar (4U) and a pillar surface of the mesial surface (5mU) of the maxillary second premolar (5U) coming into contact with each other, a fourth contact region (f4) is formed in the mandibular partial connection full arch artificial tooth (L1) by a pillar surface on an occlusal surface side of the distal surface (4dL) of the mandibular first premolar (4L) and a pillar surface of the mesial surface (5mL) of the mandibular second premolar (5L) coming into contact with each other.

According to the present invention, it is possible to efficiently fabricate in a short time a denture having an aesthetic and good occlusal relationship in harmony with perioral tissues, mastication motion, and complexion of various patients.

DESCRIPTION OF THE PREFERRED EMBODIMENT

Background to the Present Disclosure

Figure 1:
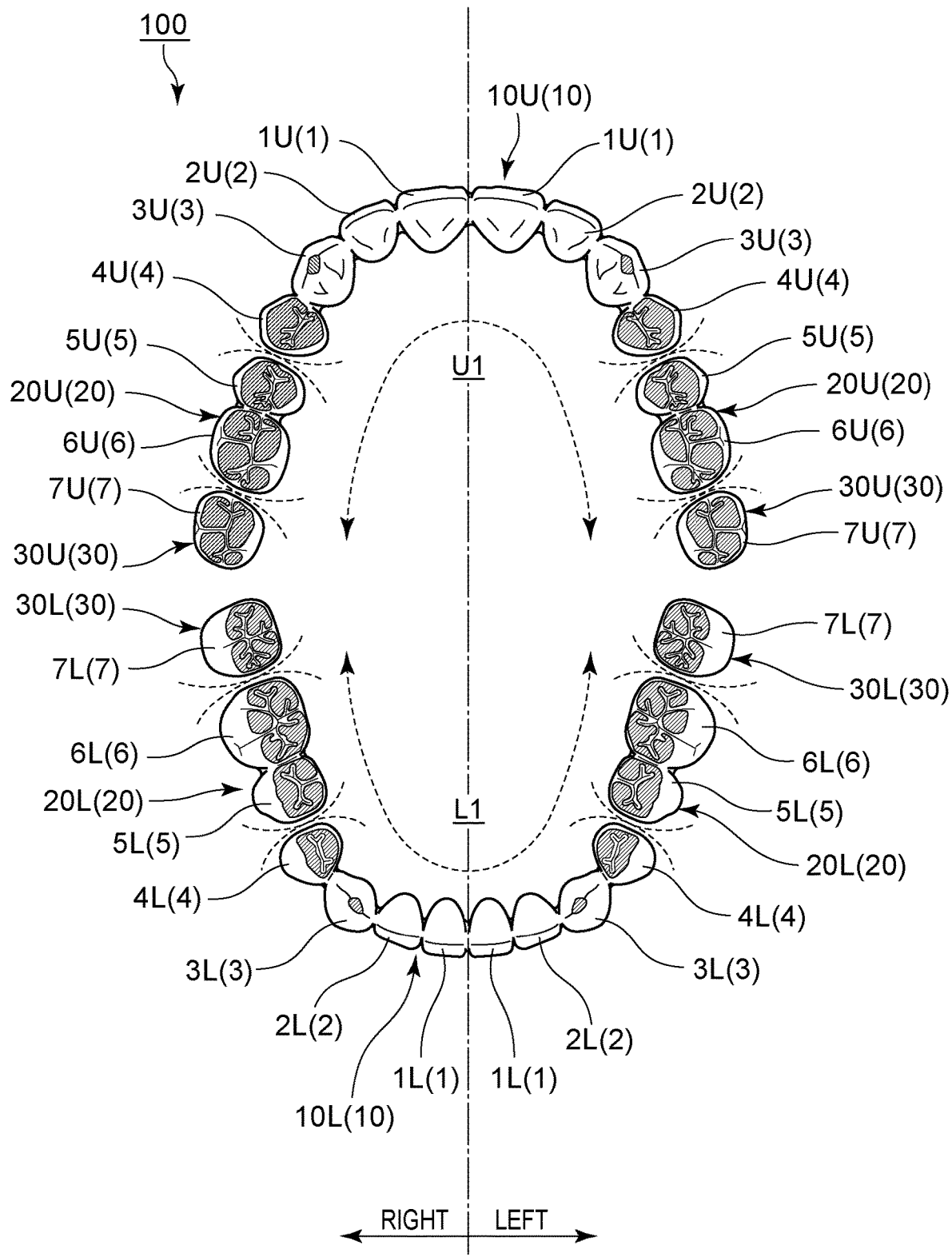
FIG. 1 is a maxillomandibular partial connection full arch artificial tooth occlusal surface aspect.

The inventors have found the following problems in International publication No. 2012/041329, JP S58-180141 A, JP H6-261917 A, JP H8-80306 A, JP 2001-137261 A, and JP 2017-176486 A.

International publication No. 2012/041329 does not clearly describe any specific difference regarding an action corresponding to a conventional arrangement operation, and as described above, since the operator is required to perform complicated work of manually arranging and correcting the contact portion of the artificial tooth in a virtual space on the computer, the design process of the denture is very burdensome.

Since JP S58-180141 A, JP H6-261917 A, JP H8-80306 A, and JP 2001-137261 A describe technologies of the age when those technologies were on the premise of the conventional denture fabrication, no consideration was made for the adaptation with the denture base fabricated using the recent CAD/CAM technology. These technologies do not achieve the effect of the most important function reproduction together with simplification of the arrangement and the alignment operation of the artificial teeth. In addition, the computer cannot reproduce the shape of the dental arch of an artificial tooth connected with a three-dimensionally movable material, and thus there is a problem that a denture base suitable for the connecting tooth cannot be fabricated.

The artificial tooth set described in JP 2001-137261 A, the positional relationship with the anterior area depends on the operator. Hence, depending on the relationship between the horizontal tegmentum and the vertical tegmentum of the anterior area, the occlusal relationship of the molar is sometimes inhibited during mandibular motion. Only the maxillary second premolar and the first molar are connected and fixed, and the other areas have to be manually arranged by the operator. Hence, appropriate skills and complicated operations are required to establish an effective occlusal relationship.

The coupled artificial tooth row described in JP 2017-176486 A is fabricated by designing an artificial tooth shape with CAD in accordance with the implantation position of an artificial tooth root varying from one patient to another, and it is costly compared with a mass product. Its versatility as a ready-made product for use in an unspecified number of edentulous patients is unknown, and it cannot be applied for a plate denture.

Therefore, in order to solve these problems, an object of the present disclosure is to provide a partial connection full arch artificial tooth for efficiently fabricating in a short time a denture having an aesthetic and good occlusal relationship in harmony with perioral tissues, mastication motion, and complexion of various patients. That is, the object of the present disclosure is to provide a partial connection full arch artificial tooth capable of adjusting the dental arch even without complicated artificial tooth arrangement of each tooth and adjustment depending on the skill of the operator not only in the conventional method but also in the design and fabrication process of the complete denture by the CAD/CAM technology, in order to be able to easily provide a good denture not only to an ordinary edentulous patient but also to a patient who is difficult to cope with by a conventional complicated denture fabrication method such as a difficult case where the ridge absorption is remarkable as described in Description of the Related Art and a case where it is difficult to visit a dentist due to a certain disease.

In any of the denture fabrication methods of the conventional method and the CAD/CAM method, the largest factor making the labor saving difficult is that the operation of arranging artificial teeth of all the 28 types of teeth is complicated, and that the reproduction of an appropriate occlusion relation depends on the skill of the operator and three-dimensional adjustment is performed. Therefore, the inventors have considered that the above problem can be solved by providing a partial connection full arch artificial tooth capable of easily giving anteroposterior adjustment curvature in accordance with the form of the artificial tooth and giving the adjustability of the dental arch, by appropriately defining a combination of regions of adjacent surfaces constituting a contact region, an angle of the denture with respect to the virtual occlusal plane, and an area thereof in a region where artificial teeth are brought into contact with each other by connecting and fixing in an appropriate occlusal relationship in advance and appropriately defining a region that should be separated and a region that may be standardized, and thus have conceived the invention of the partial connection full arch artificial tooth having the adjustability of the dental arch and the occlusion curvature described in claims.

A partial connection full arch artificial tooth of a first aspect of the present invention is a partial connection full arch artificial tooth (100) having adjustability of dental arch and occlusion curvature, including:
  a maxillary partial connection full arch artificial tooth (U1); and
  a mandibular partial connection full arch artificial tooth (L1), in which
  the maxillary partial connection full arch artificial tooth (U1) has
    a maxillary anterior tooth group artificial tooth (10U) in which eight teeth of maxillary central incisors (1U), maxillary lateral incisors (2U), maxillary canines (3U), and maxillary first premolars (4U) that are arranged on both right and left sides are connected and fixed in a center of the maxillary partial connection full arch artificial tooth (U1), and
    a maxillary occlusal center group artificial tooth (20U) in which two teeth of a maxillary second premolar (5U) and a maxillary first molar (6U) are connected and fixed and connected to the maxillary anterior tooth group artificial tooth (10U) in each of a right side and a left side of the maxillary partial connection full arch artificial tooth (U1),
  the maxillary partial connection full arch artificial tooth (U1) is configured such that an artificial tooth (30U) of a maxillary single tooth including a maxillary second molar (7U) can be connected to the maxillary occlusal center group artificial tooth (20U) in each of a right side and a left side of the maxillary partial connection full arch artificial tooth (U1),
  the mandibular partial connection full arch artificial tooth (L1) has
    a mandibular anterior tooth group artificial tooth (10L) in which eight teeth of mandibular central incisors (1L), mandibular lateral incisors (2L), mandibular canines (3L), and mandibular first premolars (4L) that are arranged on both right and left sides are connected and fixed in a center of the mandibular partial connection full arch artificial tooth (L1), and
    a mandibular occlusal center group artificial tooth (20L) in which two teeth of a mandibular second premolar (5L) and a mandibular first molar (6L) are connected and fixed and connected to the mandibular anterior tooth group artificial tooth (10L) in each of a right side and a left side of the mandibular partial connection full arch artificial tooth (L1),
  the mandibular partial connection full arch artificial tooth (L1) is configured such that an artificial tooth (30L) of a mandibular single tooth including a mandibular second molar (7L) can be connected to the mandibular occlusal center group artificial tooth (20L) in each of a right side and a left side of the mandibular partial connection full arch artificial tooth (L1),
  a distal surface (4dU) of the maxillary first premolar (4U) is provided with a region including two pillar surfaces having different angles intersecting a virtual occlusal plane (P1) of a denture on each of an occlusal surface side and a basal surface side,
  a mesial surface (5mU) of the maxillary second premolar (5U) is provided with a region including a single pillar surface that is orthogonal to a plane (P2U) including three points of a buccal cusp tip and a lingual cusp tip of a maxillary second premolar (5U) and a mesial lingual cusp tip of a maxillary first molar (6U) in a case of a cuspidate form, and orthogonal to an occlusal surface (P2'U) of the maxillary second premolar (5U) and the maxillary first molar (6U) in a case of a cuspless form,
  any one of a pillar surface on an occlusal surface side and a pillar surface on a basal surface side of the distal surface (4dU) of the maxillary first premolar (4U) forms a contact region in contact with a pillar surface of a mesial surface (5mU) of the maxillary second premolar (5U),
  a distal surface (4dL) of the mandibular first premolar (4L) is provided with a region including two pillar surfaces having different angles intersecting a virtual occlusal plane (P1L) of a denture on each of an occlusal surface side and a basal surface side,
  a mesial surface (5mL) of the mandibular second premolar (5L) is provided with a region including a single pillar surface that is orthogonal to a plane (P2L) including three points of a buccal cusp tip and a lingual cusp tip of the mandibular second premolar (5L) and a mesial lingual cusp tip of the mandibular first molar (6L) in a case of a cuspidate form, and orthogonal to an occlusal surface (P2'L) of the mandibular second premolar (5L) and the mandibular first molar (6L) in a case of a cuspless form,
  any one of a pillar surface on an occlusal surface side and a pillar surface on a basal surface side of the distal surface (4dL) of the mandibular first premolar (4L) forms a contact region in contact with a pillar surface of a mesial surface (5mL) of the mandibular second premolar (5L),
  when a first contact region (f1) is formed in the maxillary partial connection full arch artificial tooth (U1) by a pillar surface on an occlusal surface side of the distal surface (4dU) of the maxillary first premolar (4U) and a pillar surface of the mesial surface (5mU) of the maxillary second premolar (5U) coming into contact with each other, a second contact region (f2) is formed in the mandibular partial connection full arch artificial tooth (L1) by a pillar surface on a basal surface side of the distal surface (4dL) of the mandibular first premolar (4L) and a pillar surface of a mesial surface (5mL) of the mandibular second premolar (5L) coming into contact with each other, and
  when a third contact region (f3) is formed in the maxillary partial connection full arch artificial tooth (U1) by a pillar surface on a basal surface side of the distal surface (4dU) of the maxillary first premolar (4U) and a pillar surface of the mesial surface (5mU) of the maxillary second premolar (5U) coming into contact with each other, a fourth contact region (f4) is formed in the mandibular partial connection full arch artificial tooth (L1) by a pillar surface on an occlusal surface side of the distal surface (4dL) of the mandibular first premolar (4L) and a pillar surface of the mesial surface (5mL) of the mandibular second premolar (5L) coming into contact with each other.

Such a configuration has an effect of making it easy to provide a good denture having an aesthetic and functional occlusal relationship in harmony with perioral tissues, mastication motion, and complexion of various patients. The present invention has an effect of eliminating a need for operations such as the complicated artificial tooth arrangement of each tooth and the adjustment depending on the skill of the operator not only in the conventional method but also in the design and fabrication process of the complete denture by the CAD/CAM technology, achieving labor saving, which is the original purpose of the CAD/CAM technology, and greatly reducing the burden on dentists and dental technicians who fabricate dentures.

In a partial connection full arch artificial tooth of a second aspect of the present invention,
  when the first contact region (f1) is formed in the maxillary partial connection full arch artificial tooth (U1) and the second contact region (f2) is formed in the mandibular partial connection full arch artificial tooth (L1), each of the first contact region (f1) and the second contact region (f2) may have a contact area of 0.01 mm² or more and 10.0 mm² or less and may be orthogonal to a virtual occlusal plane (P1) of a denture.

In a partial connection full arch artificial tooth of a third aspect of the present invention, when the third contact region (f3) is formed in the maxillary partial connection full arch artificial tooth (U1) and the fourth contact region (f4) is formed in the mandibular partial connection full arch artificial tooth (L1), each of the third contact region (f3) and the fourth contact region (f4) may have a contact area of 0.01 mm² or more and 10.0 mm² or less and may intersect at an internal angle (θ1U or θ1L) of 70° or more and 90° or less with respect to a virtual occlusal plane (P1) of a denture.

In a partial connection full arch artificial tooth of a fourth aspect of the present invention, when the artificial tooth (30U) of the maxillary single tooth is connected to the maxillary occlusal center group artificial tooth (20U) in the maxillary partial connection full arch artificial tooth (U1) and the artificial tooth (30L) of the mandibular single tooth is connected to the mandibular occlusal center group artificial tooth (20L) in the mandibular partial connection full arch artificial tooth (L1), a distal surface (6dU) of the maxillary first molar (6U) of the maxillary occlusal center group artificial tooth (20U) is provided with a region including two pillar surfaces having different angles intersecting a virtual occlusal plane (P1) of a denture on each of an occlusal surface side and a basal surface side, a mesial surface (7mU) of the maxillary second molar (7U) is provided with a region including a single pillar surface that is orthogonal to a plane (P3U) including three points of a mesial buccal cusp tip, a mesial lingual cusp tip, and a distal buccal cusp tip of the maxillary second molar (7U) in a case of a cuspidate form, and orthogonal to an occlusal surface (P3'U) of the maxillary second molar (7U) in a case of a cuspless form, any one of a pillar surface on an occlusal surface side and a pillar surface on a basal surface side of the maxillary first molar (6U) forms a contact region with a pillar surface of the mesial surface (7mU) of the maxillary second molar (7U), a distal surface (6dL) of the mandibular first molar (6L) of the mandibular occlusal center group artificial tooth (20L) is provided with a region including two pillar surfaces having different angles intersecting a virtual occlusal plane (P1) of a denture on each of an occlusal surface side and a basal surface side, a mesial surface (7mL) of the mandibular second molar (7L) is provided with a region including a single pillar surface that is orthogonal to a plane (P3L) including three points of a mesial buccal cusp tip, a mesial lingual cusp tip, and a distal buccal cusp tip of the mandibular second molar (7L) in a case of a cuspidate form, and orthogonal to an occlusal surface (P3'L) of the mandibular second molar (7L) in a case of a cuspless form, any one of a pillar surface on an occlusal surface side and a pillar surface on a basal surface side of the mandibular first molar (6L) forms a contact region with a pillar surface of the mesial surface (7mL) of the mandibular second molar (7L), when a fifth contact region (f5) is formed in the maxillary partial connection full arch artificial tooth (U1) by a pillar surface on an occlusal surface side of the distal surface (6dU) of the maxillary first molar (6U) and a pillar surface of the mesial surface (7mU) of the maxillary second molar (7U) coming into contact with each other, a sixth contact region (f6) is formed in the mandibular partial connection full arch artificial tooth (L1) by a pillar surface on a basal surface side of the distal surface (6dL) of the mandibular first molar (6L) and a pillar surface of a mesial surface (7mL) of the mandibular second molar (7L) coming into contact with each other, and when a seventh contact region (f7) is formed in the maxillary partial connection full arch artificial tooth (U1) by a pillar surface on a basal surface side of the distal surface (6dU) of the maxillary first molar (6U) and a pillar surface of the mesial surface (7mU) of the maxillary second molar (7U) coming into contact with each other, an eighth contact region (f8) may be formed in the mandibular partial connection full arch artificial tooth (L1) by a pillar surface on an occlusal surface side of the distal surface (6dL) of the mandibular first molar (6L) and a pillar surface of the mesial surface (7mL) of the mandibular second molar (7L) coming into contact with each other.

In a partial connection full arch artificial tooth of a fifth aspect of the present invention, when the fifth contact region (f5) is formed in the maxillary partial connection full arch artificial tooth (U1) and the sixth contact region (f6) is formed in the mandibular partial connection full arch artificial tooth (L1), each of the fifth contact region (f5) and the sixth contact region (f6) may have a contact area of 0.01 mm² or more and 10.0 mm² or less and may be orthogonal to a virtual occlusal plane (P1) of a denture.

In a partial connection full arch artificial tooth of a sixth aspect of the present invention, when the seventh contact region (f7) is formed in the maxillary partial connection full arch artificial tooth (U1) and the eighth contact region (f8) is formed in the mandibular partial connection full arch artificial tooth (L1), each of the seventh contact region (f7) and the eighth contact region (f8) may have a contact area of 0.01 mm² or more and 10.0 mm² or less and may intersect at an internal angle (θ2U or θ2L) of 40° or more and 90° or less with respect to a virtual occlusal plane (P1) of a denture.

In a partial connection full arch artificial tooth of a seventh aspect of the present invention, in the mandibular partial connection full arch artificial tooth (L1), an occlusal surface of the mandibular first premolar (4L) of the mandibular anterior tooth group artificial tooth (10L), and the mandibular second premolar (5L) and the mandibular first molar (6L) of the mandibular occlusal center group artificial tooth (20L) conforms to a virtual occlusal plane (P1) of a denture, the maxillary canine (3U) of the maxillary anterior tooth group artificial tooth (10U) of the maxillary partial connection full arch artificial tooth (U1) includes a maxillary occlusal facet that is parallel to a virtual occlusal plane (P1) of a denture at a cusp (3cU), the maxillary first premolar (4U) of the maxillary anterior tooth group artificial tooth (10U), the maxillary second premolar (5U) and the maxillary first molar (6U) of the maxillary occlusal center group artificial tooth (20U), and the maxillary second molar (7U) of an artificial tooth (30U) of the maxillary single tooth are configured in a cuspless form, the mandibular canine (3L) of the mandibular anterior tooth group artificial tooth (10L) of the mandibular partial connection full arch artificial tooth (L1) includes a mandibular occlusal facet that is parallel to a virtual occlusal plane (P1) of a denture at a cusp (3cL), and the mandibular first premolar (4L) of the mandibular anterior tooth group artificial tooth (10L), the mandibular second premolar (5L) and the mandibular first molar (6L) of the mandibular occlusal center group artificial tooth (20L), and the mandibular second molar (7L) of an artificial tooth (30L) of the mandibular single tooth may be configured in a cuspless form.

Such a configuration causes the mastication movement not to be restricted by the artificial tooth, and hence has an effect of making it easy to provide a good denture having an aesthetic and functional occlusal relationship for a case where the ridge absorption is so remarkable that use of a conventional denture is difficult and a patient having difficulty in visiting a dentist due to a physical disease.

In the partial connection full arch artificial tooth of an eighth aspect of the present invention, the maxillary first premolar (4U) of the maxillary anterior tooth group artificial tooth (10U) of the maxillary partial connection full arch artificial tooth (U1), the maxillary second premolar (5U) and the maxillary first molar (6U) of the maxillary occlusal center group artificial tooth (20U), and the maxillary second molar (7U) of an artificial tooth (30U) of the maxillary single tooth are configured in a cuspidate form, and the mandibular first premolar (4L) of the mandibular anterior tooth group artificial tooth (10L) of the mandibular partial connection full arch artificial tooth (L1), the mandibular second premolar (5L) and the mandibular first molar (6L) of the mandibular occlusal center group artificial tooth (20L), and the mandibular second molar (7L) of an artificial tooth (30L) of the mandibular single tooth may be configured in a cuspidate form.

Such a configuration makes it possible to reproduce the original occlusal relationship of the cuspidate form with higher accuracy as compared with the conventional method even for a case where the cuspidate form is used for the artificial tooth, and has an effect of making it easy to provide a good denture having an aesthetic and functional occlusal relationship.

In a partial connection full arch artificial tooth of a ninth aspect of the present invention, in the mandibular partial connection full arch artificial tooth (L1), an occlusal surface of the mandibular first premolar (4L) of the mandibular anterior tooth group artificial tooth (10L), and the mandibular second premolar (5L) and the mandibular first molar (6L) of the mandibular occlusal center group artificial tooth (20L) conforms to a virtual occlusal plane (P1) of a denture, the mandibular first premolar (4L) of the mandibular anterior tooth group artificial tooth (10L) of the mandibular partial connection full arch artificial tooth (L1), the mandibular second premolar (5L) and the mandibular first molar (6L) of the mandibular occlusal center group artificial tooth (20L), and the mandibular second molar (7L) of an artificial tooth (30L) of the mandibular single tooth are configured in a cuspless form, and the maxillary first premolar (4U) of the maxillary anterior tooth group artificial tooth (10U) of the maxillary partial connection full arch artificial tooth (U1), the maxillary second premolar (5U) and the maxillary first molar (6U) of the maxillary occlusal center group artificial tooth (20U), and the maxillary second molar (7U) of an artificial tooth (30U) of the maxillary single tooth may be configured in a cuspidate form.

Such a configuration has an effect of making it easy to provide a therapeutic denture for a patient with an unstable jaw position or a patient with varied tapping points described in Description of the Related Art.

In view of the above, the partial connection full arch artificial tooth having adjustability of dental arch and occlusion curvature of the present disclosure makes it possible to easily provide a good denture having an aesthetic and functional occlusal relationship for a patient who is difficult to cope with by a conventional complicated denture fabrication method such as a difficult case where the ridge absorption is remarkable and a case where it is difficult to visit a dentist due to a certain disease such as a person requiring nursing care, and contributes to the improvement of nutritional intake of the patient through prevention of a decline in the oral function and recovery of the eating function, thereby contributing to the extension of healthy life in the super-aged society.

The present invention will be described below in detail with reference to the drawings. Note that the drawings present the most effective examples for easy understanding, the present invention is not limited thereto.

First Embodiment

FIG. 1 shows a view of a partial connection full arch artificial tooth 100 of a first embodiment of the present invention as viewed from an occlusal surface. FIG. 1 shows a maxillary partial connection full arch artificial tooth U1 in an upper section, and a mandibular partial connection full arch artificial tooth L1 in a lower section. The partial connection full arch artificial tooth 100 includes the maxillary partial connection full arch artificial tooth U1 and the mandibular partial connection full arch artificial tooth L1. The maxillary partial connection full arch artificial tooth U1 and the mandibular partial connection full arch artificial tooth L1 each include five types of components of an anterior tooth group artificial tooth 10, and, for each of the right side and the left side, an occlusal center group artificial tooth 20, and an artificial tooth 30 of a single tooth of the second molar 7.

Eight teeth of central incisors 1, lateral incisors 2, canines 3, and first premolars 4U on right and left sides are connected and fixed to the anterior tooth group artificial tooth 10. Here, the artificial tooth 30 of a single tooth of the second molar 7 can be excluded from the configuration if there is no artificial tooth arrangement space due to the shape of the ridge or if there is a concern about detachment of the denture at the time of occlusion. That is, the artificial tooth 30 of a single tooth of the second molar 7 is configured to be connectable to the occlusal center group artificial tooth 20.

The maxillary partial connection full arch artificial tooth U1 has a maxillary anterior tooth group artificial tooth 10U, a maxillary occlusal center group artificial tooth 20U, and an artificial tooth 30U of a maxillary single tooth. The maxillary occlusal center group artificial tooth 20U is configured to be connectably attached to the maxillary anterior tooth group artificial tooth 10U. The artificial tooth 30U of the maxillary single tooth is configured to be connectably attached to the maxillary occlusal center group artificial tooth 20U.

The maxillary anterior tooth group artificial tooth 10U is arranged in the center of the maxillary partial connection full arch artificial tooth U1. The maxillary anterior tooth group artificial tooth 10U has maxillary central incisors 1U, maxillary lateral incisors 2U, maxillary canines 3U, and maxillary first premolars 4U, which are arranged on both right and left sides. The eight teeth of the maxillary central incisors 1U, the maxillary lateral incisors 2U, the maxillary canines 3U, and the maxillary first premolars 4U, which are arranged on both right and left sides, are connected and fixed.

The maxillary occlusal center group artificial tooth 20U is arranged on each of the right side and the left side of the maxillary partial connection full arch artificial tooth U1, and is connected to the maxillary anterior tooth group artificial tooth 10U. For example, the maxillary occlusal center group artificial tooth 20U is mechanically connected to the maxillary anterior tooth group artificial tooth 10U. The maxillary occlusal center group artificial tooth 20U has a maxillary second premolar 5U and a maxillary first molar 6U on each of the right side and left side of the maxillary partial connection full arch artificial tooth U1. On each of the right side and the left side of the maxillary partial connection full arch artificial tooth U1, two teeth of the maxillary second premolar 5U and the maxillary first molar 6U are connected and fixed.

The artificial tooth 30U of the maxillary single tooth is arranged on each of the right side and the left side of the maxillary partial connection full arch artificial tooth U1. The artificial tooth 30U of the maxillary single tooth has a maxillary second molar 7U. The artificial tooth 30U of the maxillary single tooth is connectably attached to the maxillary occlusal center group artificial tooth 20U on each of the right side and left side of the maxillary partial connection full arch artificial tooth U1.

The mandibular partial connection full arch artificial tooth L1 has a mandibular anterior tooth group artificial tooth 10L, a mandibular occlusal center group artificial tooth 20L, and an artificial tooth 30L of a mandibular single tooth. The mandibular occlusal center group artificial tooth 20L is connected to the mandibular anterior tooth group artificial tooth 10L. The artificial tooth 30L of the mandibular single tooth is connectably attached to the mandibular occlusal center group artificial tooth 20L.

The mandibular anterior tooth group artificial tooth 10L is arranged in the center of the mandibular partial connection full arch artificial tooth L1. The mandibular anterior tooth group artificial tooth 10L has mandibular central incisors 1L, mandibular lateral incisors 2L, mandibular canines 3L, and mandibular first premolars 4L, which are arranged on both right and left sides. The eight teeth of the mandibular central incisors 1L, the mandibular lateral incisors 2L, the mandibular canines 3L, and the mandibular first premolars 4L, which are arranged on both right and left sides, are connected and fixed.

The mandibular occlusal center group artificial tooth 20L is arranged on each of the right side and the left side of the mandibular partial connection full arch artificial tooth L1, and is connected to the mandibular anterior tooth group artificial tooth 10L. For example, the mandibular occlusal center group artificial tooth 20L is mechanically connected to the mandibular anterior tooth group artificial tooth 10L. The mandibular occlusal center group artificial tooth 20L has a mandibular second premolar 5L and a mandibular first molar 6L on each of the right side and left side of the mandibular partial connection full arch artificial tooth L1. On each of the right side and the left side of the mandibular partial connection full arch artificial tooth L1, two teeth of the mandibular second premolar 5L and the mandibular first molar 6L are connected and fixed.

The artificial tooth 30L of the mandibular single tooth is arranged on each of the right side and the left side of the mandibular partial connection full arch artificial tooth L1. The artificial tooth 30L of the mandibular single tooth has a mandibular second molar 7L. The artificial tooth 30L of the mandibular single tooth is connectably attached to the mandibular occlusal center group artificial tooth 20L on each of the right side and left side of the mandibular partial connection full arch artificial tooth L1.

Figure 2:
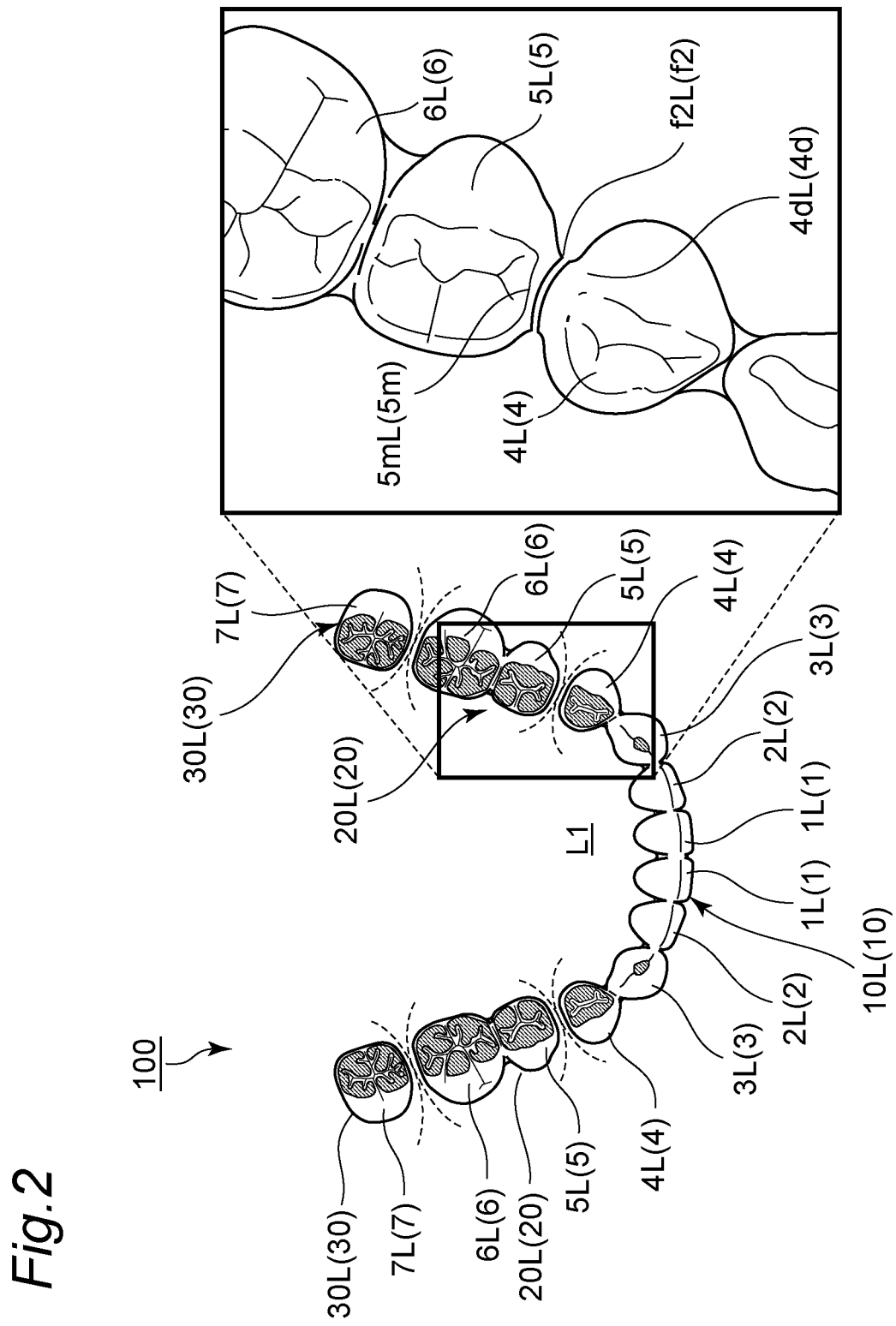
FIG. 2 is an enlarged view of a contact region of a mandibular partial connection full arch artificial tooth.

FIG. 2 shows a state in which a contact region between the first premolar 4 of the anterior tooth group artificial tooth 10 and the second premolar 5 of the occlusal center group artificial tooth 20 of the mandibular partial connection full arch artificial tooth L1 in the occlusal surface aspect of the partial connection full arch artificial tooth 100 shown in FIG. 1 is enlarged. As long as the shape of the region constituting the contact region is a pillar surface linear in the direction where the surface defined in the claims and each pillar surface intersect, the cross-sectional shape is not particularly limited. As a preferred example, however, when the cross-sectional shape of a contact region f2 formed by a pillar surface on a basal surface side of a mesial surface 5m of the first premolar 4 and a distal surface 5d of the second premolar 5 as shown in the bird's-eye view is viewed from a direction orthogonal to an occlusal plane P1, i.e., from an upper surface, the cross-sectional shapes may be circular cylindrical curved surfaces. This enables the contact region between the anterior tooth group artifical tooth 10 and the occlusal center group artificial tooth 20 to come into contact with each other at a discretionary angle on the right and left, enables horizontal adjustment such as widening or narrowing of the dental arch, and hence enables harmonization with an unspecified number of patients having different ridge shapes.

The example shown in FIG. 2 describes an example of the mandibular partial connection full arch artificial tooth L1, but the present invention is not limited to this. For example, the maxillary partial connection full arch artificial tooth U1 may also have the above configuration.

Figure 3A:
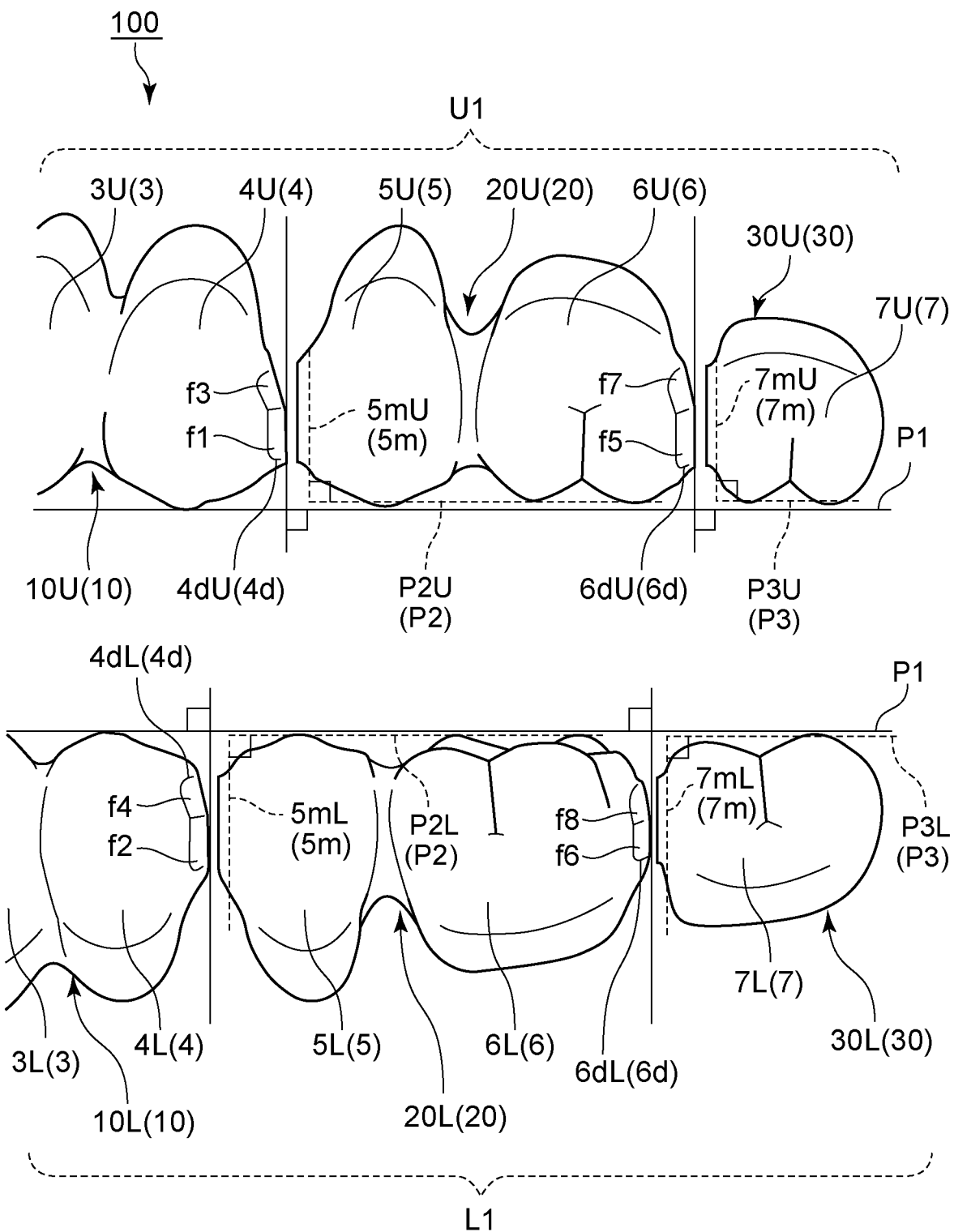
FIG. 3a is an enlarged view of a contact region lateral aspect (without anteroposterior curvature)
Figure 3B:
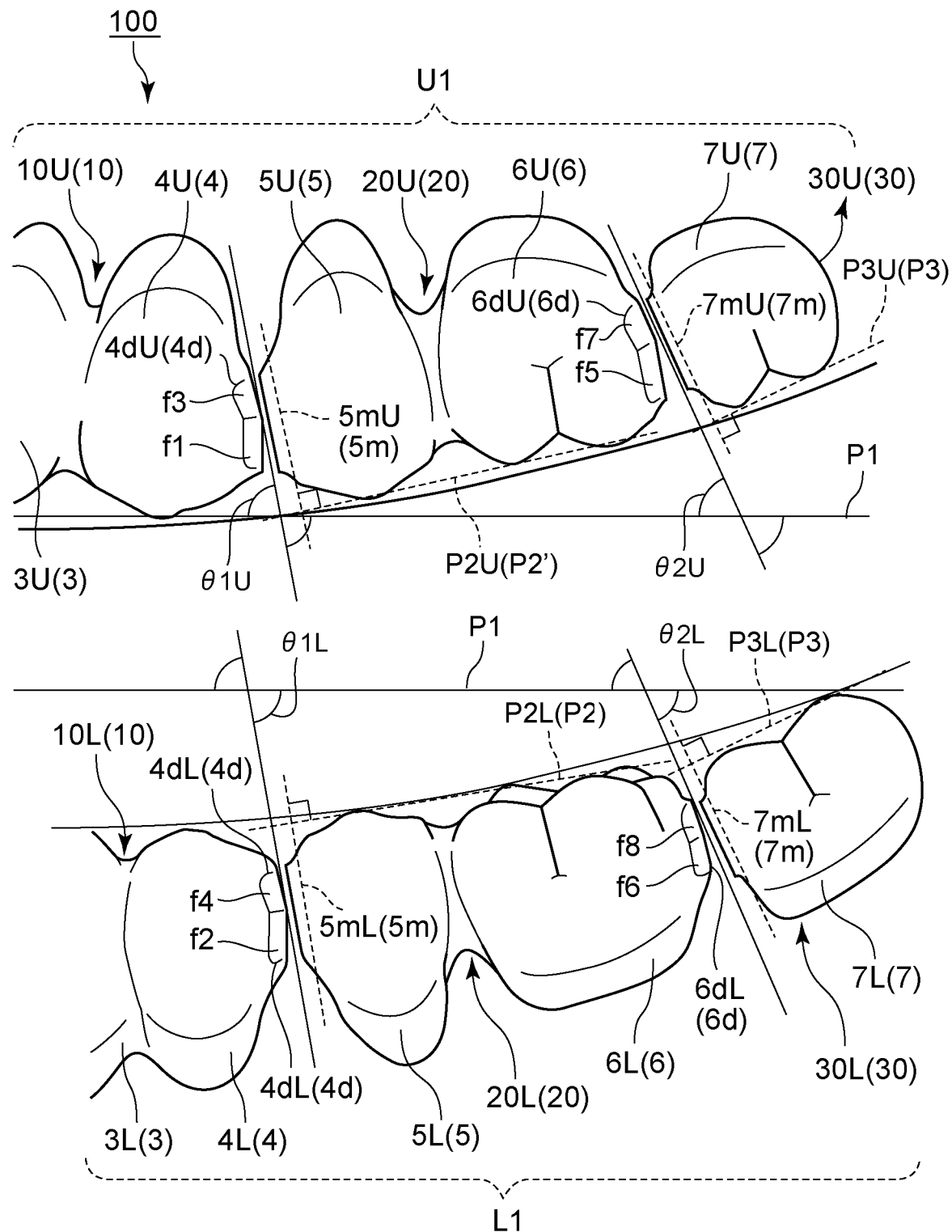
FIG. 3b is an enlarged view of a contact region lateral aspect (with anteroposterior curvature)

FIGS. 3a and 3b show the state of the partial connection full arch artificial tooth 100 as viewed from the side for each option of the contact region. When viewed from the side, since the anterior tooth group artificial tooth 10 includes the first premolars 4U in addition to the central incisors 1, the lateral incisors 2, and the canines 3 on the right and left sides, the anterior and the molar teeth can be fixed in a vertically proper positional relationship. Hence, it is possible to prevent a gap or interference in eccentric motion from occurring in the anterior and the molar teeth due to a difference in arrangement, and to reproduce an appropriate occlusal relationship aesthetically without a feeling of strangeness. Here, a distal surface 4d of the first premolar 4 of the anterior tooth group artificial tooth 10 is provided with a contact region including two pillar surfaces having different angles intersecting a virtual occlusal plane P1 of a denture on each of an occlusal surface side and a basal surface side. A mesial surface 5m of the second premolar 5 includes a region including a single pillar surface. The region is orthogonal to a plane P2 including three points of a buccal cusp tip and a lingual cusp tip of the second premolar 5 and a lingual cusp tip of the first molar 6 in a case of a cuspidate form (see FIGS. 3a and 3b), and orthogonal to an occlusal surface P2' of the second premolar 5 and the first molar 6 in a case of a cuspless form (see FIG. 4). Note that the "cuspidate form" means a form having a cusp, e.g., means a form having a convex portion on the occlusal surface of the molar. The "cuspless form" means a form having no cusp, e.g., means a form having an occlusal surface of the molar are that is flat and has no convex shape such as a cusp.

Two types of contact regions of the distal surface 4d of the first premolar 4 form a contact region with any one of the pillar surfaces when coming into contact with the distal surface 5*d* of the second premolar 5, whereby it is possible to select whether to give anteroposterior adjustment curvature or to conform the virtual occlusal plane P1 of the denture without giving anteroposterior adjustment curvature.

More specifically, in the maxillary partial connection full arch artificial tooth U1, a distal surface 4*d*U of the maxillary first premolar 4U is provided with a region including two pillar surfaces having different angles intersecting the virtual occlusal plane P1 of a denture on each of an occlusal surface side and a basal surface side. A mesial surface 5*m*U of the maxillary second premolar 5U is provided with a region including a single pillar surface that is orthogonal to a plane P2U including three points of a buccal cusp tip and a lingual cusp tip of a maxillary second premolar 5U and a mesial lingual cusp tip of a maxillary first molar 6U in a case of a cuspidate form (see FIGS. 3*a* and 3*b*), and orthogonal to an occlusal surface P2'U of the maxillary second premolar 5U and the maxillary first molar 6U in a case of a cuspless form (see FIG. 4). Any one of a pillar surface on an occlusal surface side and a pillar surface on a basal surface side of the distal surface 4*d*U of the maxillary first premolar 4U forms a contact region in contact with a pillar surface of the mesial surface 5*m*U of the maxillary second premolar 5U.

A distal surface 4*d*L of the mandibular first premolar 4L is provided with a region including two pillar surfaces having different angles intersecting the virtual occlusal plane P1 of a denture on each of an occlusal surface side and a basal surface side. A mesial surface 5*m*L of the mandibular second premolar 5L is provided with a region including a single pillar surface that is orthogonal to a plane P2L including three points of a buccal cusp tip and a lingual cusp tip of a mandibular second premolar 5L and a mesial lingual cusp tip of a mandibular first molar 6L in a case of a cuspidate form (see FIGS. 3*a* and 3*b*), and orthogonal to an occlusal surface P2'L of the mandibular second premolar 5L and the mandibular first molar 6L in a case of a cuspless form (see FIG. 4). Any one of a pillar surface on an occlusal surface side and a pillar surface on a basal surface side of the distal surface 4*d*L of the mandibular first premolar 4L forms a contact region in contact with a pillar surface of the mesial surface 5*m*L of the mandibular second premolar 5L.

Distal surfaces 6*d* of the first molars 6 of the occlusal center group artificial teeth 20 on the right and left are also provided with two contact regions including two pillar surfaces having different angles intersecting the virtual occlusal plane P1 of a denture on each of an occlusal surface side and a basal surface side. A mesial surface 7*m* of the second molar 7 is provided with a region including a single surface. A region including the single surface is orthogonal to a plane P3 including three points of a mesial buccal cusp tip, a mesial lingual cusp tip, and a distal buccal cusp tip of the second molar 7 in a case of a cuspidate form, and orthogonal to an occlusal surface P3' of the second molar 7 in a case of a cuspless form.

Two types of contact regions of the distal surface 6*d* of the first molar 6 also form a contact region with any one of the pillar surfaces when coming into contact with the mesial surface 7*m* of the second molar 7, whereby it is possible to select whether to give anteroposterior adjustment curvature or to conform the virtual occlusal plane P1 of the denture without giving anteroposterior adjustment curvature.

More specifically, when the artificial tooth 30U of the maxillary single tooth is connected to the maxillary occlusal center group artificial tooth 20U in the maxillary partial connection full arch artificial tooth U1 and the artificial tooth 30L of the mandibular single tooth is connected to the mandibular occlusal center group artificial tooth 20L in the mandibular partial connection full arch artificial tooth L1, a distal surface 6*d*U of the maxillary first molar 6U of the maxillary occlusal center group artificial tooth 20U is provided with a region including two pillar surfaces having different angles intersecting a virtual occlusal plane P1 of a denture on each of an occlusal surface side and a basal surface side. A mesial surface 7*m*U of the maxillary second molar 7U is provided with a region including a single pillar surface that is orthogonal to a plane P3U including three points of a mesial buccal cusp tip, a mesial lingual cusp tip, and a distal buccal cusp tip of the maxillary second molar 7U in a case of a cuspidate form (see FIGS. 3*a* and 3*b*), and orthogonal to an occlusal surface P3'U of the maxillary second molar 7U in a case of a cuspless form (see FIG. 4). Any one of a pillar surface on an occlusal surface side and a pillar surface on a basal surface side of the maxillary first molar 6U forms a contact region with a pillar surface of the mesial surface 7*m*U of the maxillary second molar 7U.

A distal surface 6*d*L of the mandibular first molar 6L of the mandibular occlusal center group artificial tooth 20L is provided with a region including two pillar surfaces having different angles intersecting the virtual occlusal plane P1 of a denture on each of an occlusal surface side and a basal surface side. A mesial surface 7*m*L of the mandibular second molar 7L is provided with a region including a single pillar surface that is orthogonal to a plane P3L including three points of a mesial buccal cusp tip, a mesial lingual cusp tip, and a distal buccal cusp tip of the mandibular second molar 7L in a case of a cuspidate form (see FIGS. 3*a* and 3*b*), and orthogonal to an occlusal surface P3'L of the mandibular second molar 7L in a case of a cuspless form (see FIG. 4). Any one of a pillar surface on an occlusal surface side and a pillar surface on a basal surface side of the mandibular first molar 6L forms a contact region with a pillar surface of the mesial surface 7*m*L of the mandibular second molar 7L.

FIG. 3*a* shows a combination of contact regions with respect to the maxillary partial connection full arch artificial tooth U1 and the mandibular partial connection full arch artificial tooth L1 when no anteroposterior adjustment curvature is given in the partial connection full arch artificial tooth 100. Preferred examples of the case of giving no anteroposterior adjustment curvature include a case where both the maxillary partial connection full arch artificial tooth U1 and the mandibular partial connection full arch artificial tooth L1 are in a cuspless form, and a case where the maxillary partial connection full arch artificial tooth U1 in a cuspidate form and the mandibular partial connection full arch artificial tooth L1 in a cuspless form are used in combination. However, the form of the artificial tooth used in the present invention is not limited to this, and a widely known artificial tooth can be used. Note that FIG. 3*a* shows an example of the partial connection full arch artificial tooth 100 including the maxillary partial connection full arch artificial tooth U1 of a cuspidate form and the mandibular partial connection full arch artificial tooth L1 of a cuspidate form.

Here, a contact region f1 is formed in the maxillary partial connection full arch artificial tooth U1 by a pillar surface on an occlusal surface side of the distal surface 4*d* of the first premolar 4 and a pillar surface of the mesial surface 5*m* of the second premolar 5 coming into contact with each other, and a contact region f2 is formed in the mandibular partial connection full arch artificial tooth L1 by a pillar surface on a basal surface side of the distal surface 4*d* of the first premolar 4 and a pillar surface of a mesial surface 5*m* of the second premolar 5 coming into contact with each other. The contact area is 0.01 mm² or more and 10.0 mm² or less, preferably 0.02 mm² or more and 9.0 mm² or less, for both the maxillary partial connection full arch artificial tooth U1 and the mandibular partial connection full arch artificial tooth L1. Each contact region is orthogonal to the virtual occlusal plane P1 of a denture.

More specifically, the first contact region f1 is formed in the maxillary partial connection full arch artificial tooth U1 by a pillar surface on an occlusal surface side of the distal surface 4dU of the maxillary first premolar 4U and a pillar surface of the mesial surface 5mU of the maxillary second premolar 5U coming into contact with each other. The second contact region f2 is formed in the mandibular partial connection full arch artificial tooth L1 by a pillar surface on a basal surface side of the distal surface 4dL of the mandibular first premolar 4L and a pillar surface of the mesial surface 5mL of the mandibular second premolar 5L coming into contact with each other. The first contact region f1 and the second contact region f2 each have a contact area of 0.01 mm² or more and 10.0 mm² or less, preferably have a contact area of 0.02 mm² or more and 9.0 mm² or less. Each of the first contact region f1 and the second contact region f2 is orthogonal to the virtual occlusal plane P1 of a denture.

Next, a contact region f5 is formed in the maxillary partial connection full arch artificial tooth U1 by a pillar surface on an occlusal surface side of the distal surface 6d of the first molar 6 and a pillar surface of the mesial surface 7m of the second molar 7 coming into contact with each other, and a contact region f6 is formed in the mandibular partial connection full arch artificial tooth L1 by a pillar surface on a basal surface side of the distal surface 6d of the first molar 6 and a pillar surface of a mesial surface 7m of the second molar 7 coming into contact with each other. The contact area is 0.01 mm² or more and 10.0 mm² or less, preferably 0.02 mm² or more and 9.0 mm² or less, for both the maxillary partial connection full arch artificial tooth U1 and the mandibular partial connection full arch artificial tooth L1. Each contact region is orthogonal to the virtual occlusal plane P1 of a denture.

More specifically, the fifth contact region f5 is formed in the maxillary partial connection full arch artificial tooth U1 by a pillar surface on an occlusal surface side of the distal surface 6dU of the maxillary first molar 6U and a pillar surface of the mesial surface 7mU of the maxillary second molar 7U coming into contact with each other. The sixth contact region f6 is formed in the mandibular partial connection full arch artificial tooth L1 by a pillar surface on a basal surface side of the distal surface 6dL of the mandibular first molar 6L and a pillar surface of the mesial surface 7mL of the mandibular second molar 7L coming into contact with each other. The fifth contact region f5 and the sixth contact region f6 each have a contact area of 0.01 mm² or more and 10.0 mm² or less, preferably have a contact area of 0.02 mm² or more and 9.0 mm² or less. Each of the fifth contact region f5 and the sixth contact region f6 is orthogonal to the virtual occlusal plane P1 of a denture.

The contact region between the first premolar 4 and the second premolar 5 and the combination of the first molar 6 and the second molar 7 do not necessarily have to be aligned with each other. For example, the anteroposterior adjustment curvature is not given to the first premolar 4 and the second premolar 5, and the combination of the contact regions described later can be adopted for the first molar 6 and the second molar 7 and the anteroposterior adjustment curvature can be applied only to that area. As described earlier, the artificial tooth 30 of a single tooth of the second molar 7 can be excluded from the configuration if there is no artificial tooth arrangement space due to the shape of the ridge or if there is a concern about detachment of the denture at the time of occlusion.

FIG. 3b shows a combination of contact regions with respect to the maxillary partial connection full arch artificial tooth U1 and the mandibular partial connection full arch artificial tooth L1 when anteroposterior adjustment curvature is given. Although the occlusal surface form of the artificial tooth is not limited, a cuspidate tooth is preferable. The anteroposterior adjustment curvature optimum to the form of the artificial tooth is given in advance, and as a means for easily reproducing it, the contact region shown in the figure is selected.

Here, a contact region f3 is formed in the maxillary partial connection full arch artificial tooth U1 by a pillar surface on a basal surface side of the distal surface 4d of the first premolar 4 and a pillar surface of the mesial surface 5m of the second premolar 5 coming into contact with each other, and a contact region f4 is formed in the mandibular partial connection full arch artificial tooth L1 by a pillar surface on an occlusal surface side of the distal surface 4d of the first premolar 4 and a pillar surface of a mesial surface 5m of the second premolar 5 coming into contact with each other. The contact area is 0.01 mm² or more and 10.0 mm² or less, preferably 0.02 mm² or more and 9.0 mm² or less, for both the maxillary partial connection full arch artificial tooth U1 and the mandibular partial connection full arch artificial tooth L1. Each contact region intersects the virtual occlusal plane P1 of the denture at an internal angle of 70° or more and less than 90°, and preferably 75° or more and 88° or less.

More specifically, the third contact region f3 is formed in the maxillary partial connection full arch artificial tooth U1 by a pillar surface on a basal surface side of the distal surface 4dU of the maxillary first premolar 4U and a pillar surface of the mesial surface 5mU of the maxillary second premolar 5U coming into contact with each other. The fourth contact region f4 is formed in the mandibular partial connection full arch artificial tooth L1 by a pillar surface on an occlusal surface side of the distal surface 4dL of the mandibular first premolar 4L and a pillar surface of the mesial surface 5mL of the mandibular second premolar 5L coming into contact with each other. The third contact region f3 and the fourth contact region f4 each have a contact area of 0.01 mm² or more and 10.0 mm² or less, preferably have a contact area of 0.02 mm² or more and 9.0 mm² or less. The third contact region f3 and the fourth contact region f4 intersect the virtual occlusal plane P1 of the denture at internal angles 81U and 91L, respectively, of 70° or more and less than 90°. Preferably, the internal angles 91U and 01L are 75° or more and 88° or less.

Next, a contact region f7 is formed in the maxillary partial connection full arch artificial tooth U1 by a pillar surface on a basal surface side of the distal surface 6d of the first molar 6 and a pillar surface of the mesial surface 7m of the second molar 7 coming into contact with each other, and a contact region f8 is formed in the mandibular partial connection full arch artificial tooth L1 by a pillar surface on an occlusal surface side of the distal surface 6d of the first molar 6 and a pillar surface of a mesial surface 7m of the second molar 7 coming into contact with each other. The contact area is 0.01 mm² or more and 10.0 mm² or less, preferably 0.02 mm² or more and 9.0 mm² or less, for both the maxillary partial connection full arch artificial tooth U1 and the mandibular partial connection full arch artificial tooth L1. Each contact region intersects the virtual occlusal plane P1 of the denture at an internal angle of 40° or more and less than 90°, and preferably 45° or more and 88° or less.

More specifically, the seventh contact region f7 is formed in the maxillary partial connection full arch artificial tooth U1 by a pillar surface on a basal surface side of the distal surface 6dU of the maxillary first molar 6U and a pillar surface of the mesial surface 7mU of the maxillary second molar 7U coming into contact with each other. The eighth contact region f8 is formed in the mandibular partial connection full arch artificial tooth L1 by a pillar surface on an occlusal surface side of the distal surface 6dL of the mandibular first molar 6L and a pillar surface of the mesial surface 7mL of the mandibular second molar 7L coming into contact with each other. The seventh contact region f7 and the eighth contact region f8 each have a contact area of 0.01 mm$^2$ or more and 10.0 mm$^2$ or less, preferably have a contact area of 0.02 mm$^2$ or more and 9.0 mm$^2$ or less. The seventh contact region f7 and the eighth contact region f8 intersect the virtual occlusal plane P1 of the denture at internal angles θ2U and θ2L, respectively, of 40° or more and less than 90°. Preferably, the internal angles θ2U and θ2L are 45° or more and 88° or less.

As described earlier, the artificial tooth 30 of a single tooth of the second molar 7 can be excluded from the configuration if there is no artificial tooth arrangement space due to the shape of the ridge or if there is a concern about detachment of the denture at the time of occlusion.

Figure 4:
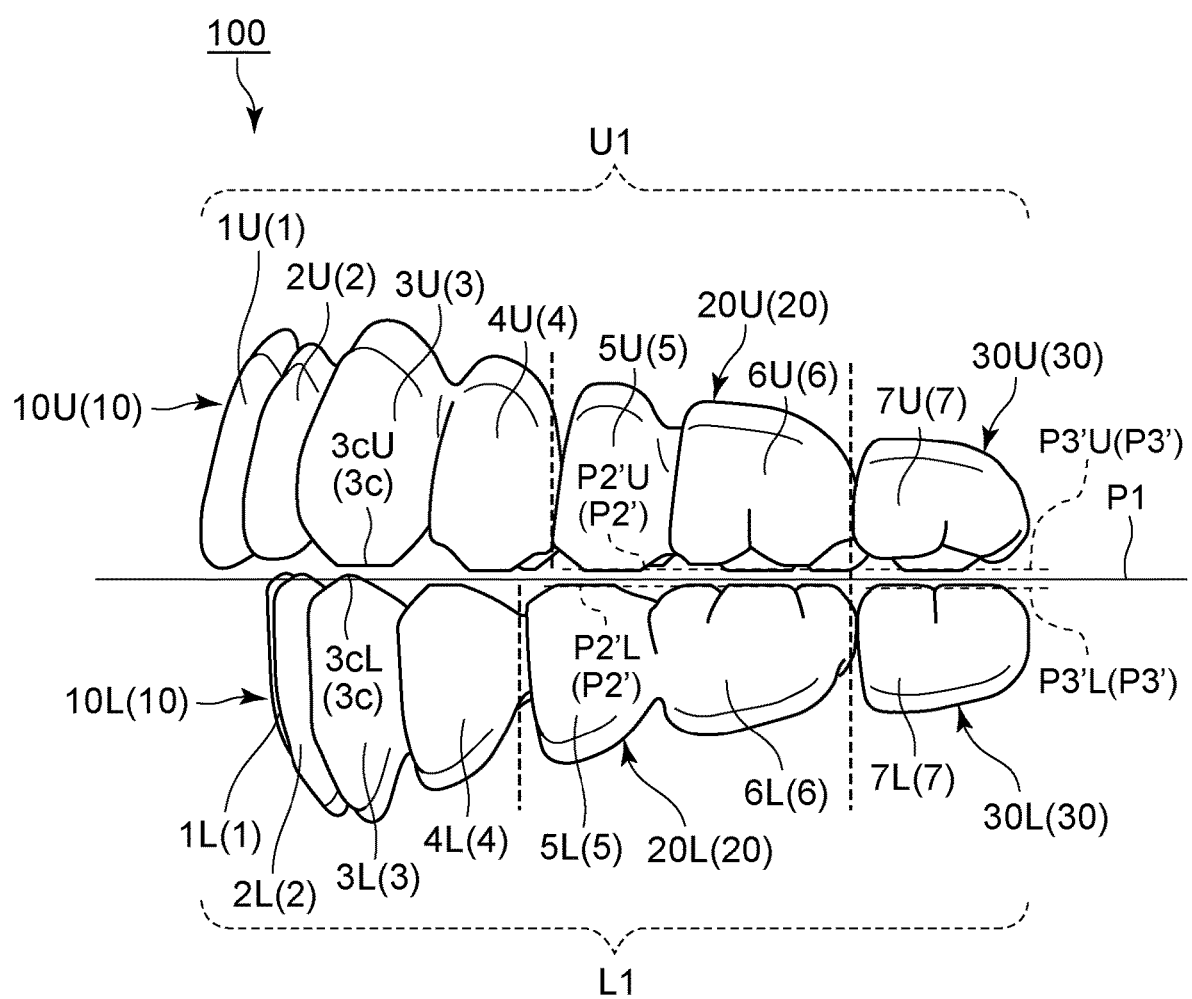
FIG. 4 is a maxillomandibular artificial tooth lateral aspect (maxillomandibular cuspless form)

FIG. 4 shows another example of the partial connection full arch artificial tooth 100 viewed from the side. In the example shown in FIG. 4, the tooth crown shape of the molar is a cuspless form for both the maxillary partial connection full arch artificial tooth U1 and the mandibular partial connection full arch artificial tooth L1.

The occlusal surface of the first premolar 4 of the anterior tooth group artificial tooth 10 of the mandibular partial connection full arch artificial tooth L1, and the second premolar 5 and the first molar 6 of the occlusal center group artificial tooth 20 conforms to the virtual occlusal plane P1 of the denture. The canine 3 of the anterior tooth group artificial tooth 10 of the maxillary partial connection full arch artificial tooth U1 and the mandibular partial connection full arch artificial tooth L1 includes an occlusal facet parallel to the virtual occlusal plane P1 of the denture at a cusp 3c. The first premolar 4 of the anterior tooth group artificial tooth 10, the second premolar 5 of the occlusal center group artificial tooth 20, the first molar 6, and the second molar 7 of the artificial tooth 30 of a single tooth are all configured in a cuspless form.

More specifically, in the mandibular partial connection full arch artificial tooth L1, the occlusal surface of the mandibular first premolar 4L of the mandibular anterior tooth group artificial tooth 10L, and the mandibular second premolar 5L and the mandibular first molar 6L of the mandibular occlusal center group artificial tooth 20L conforms to the virtual occlusal plane P1 of the denture. The maxillary canine 3U of the maxillary anterior tooth group artificial tooth 10U of the maxillary partial connection full arch artificial tooth U1 includes a maxillary occlusal facet that is parallel to the virtual occlusal plane P1 of the denture at a cusp 3cU. The maxillary first premolar 4U of the maxillary anterior tooth group artificial tooth 10U, the maxillary second premolar 5U and the maxillary first molar 6U of the maxillary occlusal center group artificial tooth 20U, and the maxillary second molar 7U of the artificial tooth 30U of the maxillary single tooth are configured in a cuspless form. The mandibular canine 3L of the mandibular anterior tooth group artificial tooth 10L of the mandibular partial connection full arch artificial tooth L1 includes a mandibular occlusal facet that is parallel to the virtual occlusal plane P1 of the denture at a cusp 3cL. The mandibular first premolar 4L of the mandibular anterior tooth group artificial tooth 10L, the mandibular second premolar 5L and the mandibular first molar 6L of the mandibular occlusal center group artificial tooth 20L, and the mandibular second molar 7L of the artificial tooth 30L of the mandibular single tooth are configured in a cuspless form.

As described earlier, the artificial tooth 30 of a single tooth of the second molar 7 can be excluded from the configuration if there is no artificial tooth arrangement space due to the shape of the ridge or if there is a concern about detachment of the denture at the time of occlusion. This causes the mastication movement not to be restricted by the artificial tooth, and hence has an effect of making it easy to provide a good denture having an aesthetic and functional occlusal relationship for a case where the ridge absorption is so remarkable that use of a conventional denture is difficult as described earlier in particular, and a patient having difficulty in visiting a dentist due to a physical disease.

Figure 5:
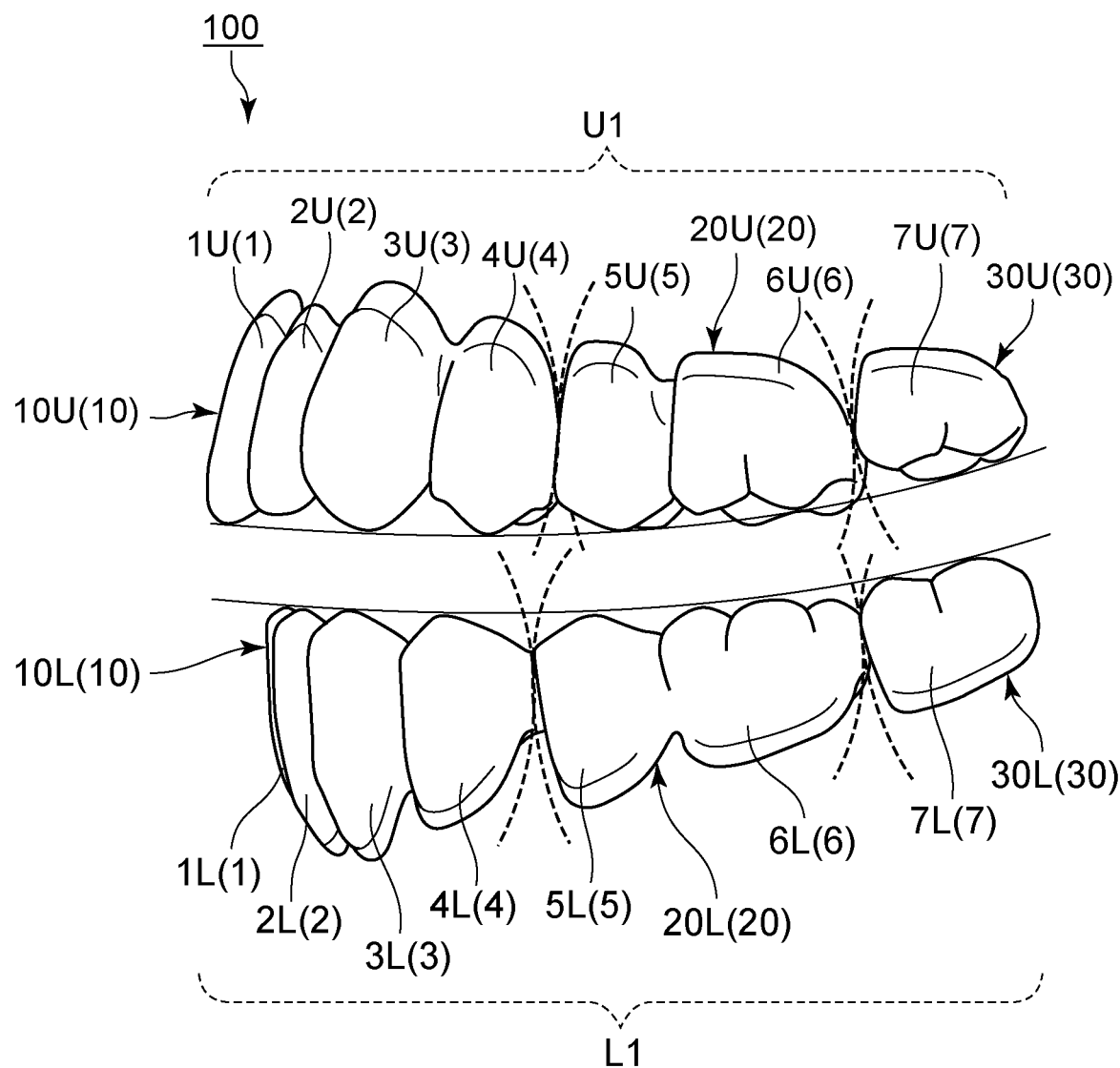
FIG. 5 is a maxillomandibular artificial tooth lateral aspect (maxillomandibular cuspidate form)

FIG. 5 shows another example of the partial connection full arch artificial tooth 100 viewed from the side. In the example shown in FIG. 5, the molar of the maxillary partial connection full arch artificial tooth U1, the first premolar 4 of the anterior tooth group artificial tooth 10 of the mandibular partial connection full arch artificial tooth L1, the second premolar 5 and the first molar 6 of the occlusal center group artificial tooth 20, and the second molar 7 of the artificial tooth 30 of the single tooth are all in a cuspidate form.

More specifically, the maxillary first premolar 4U of the maxillary anterior tooth group artificial tooth 10U of the maxillary partial connection full arch artificial tooth U1, the maxillary second premolar 5U and the maxillary first molar 6U of the maxillary occlusal center group artificial tooth 20U, and the maxillary second molar 7U of the artificial tooth 30U of the maxillary single tooth are configured in a cuspidate form. The mandibular first premolar 4L of the mandibular anterior tooth group artificial tooth 10L of the mandibular partial connection full arch artificial tooth L1, the mandibular second premolar 5L and the mandibular first molar 6L of the mandibular occlusal center group artificial tooth 20L, and the mandibular second molar 7L of the artificial tooth 30L of the mandibular single tooth are configured in a cuspidate form.

Although the form of the cuspidate tooth is not particularly limited, it is possible to select an artificial tooth form as shown in JP 5231398 B2 or JP 5214621 B2 as an example of a preferred cuspidate tooth. As described earlier, the artificial tooth 30 of a single tooth of the second molar 7 can be excluded from the configuration if there is no artificial tooth arrangement space due to the shape of the ridge or if there is a concern about detachment of the denture at the time of occlusion. This makes it possible to reproduce the original occlusal relationship of the cuspidate form with higher accuracy as compared with the conventional method even for a case where the cuspidate form is used for the artificial tooth, and has an effect of making it easy to provide a good denture having an aesthetic and functional occlusal relationship.

Figure 6:
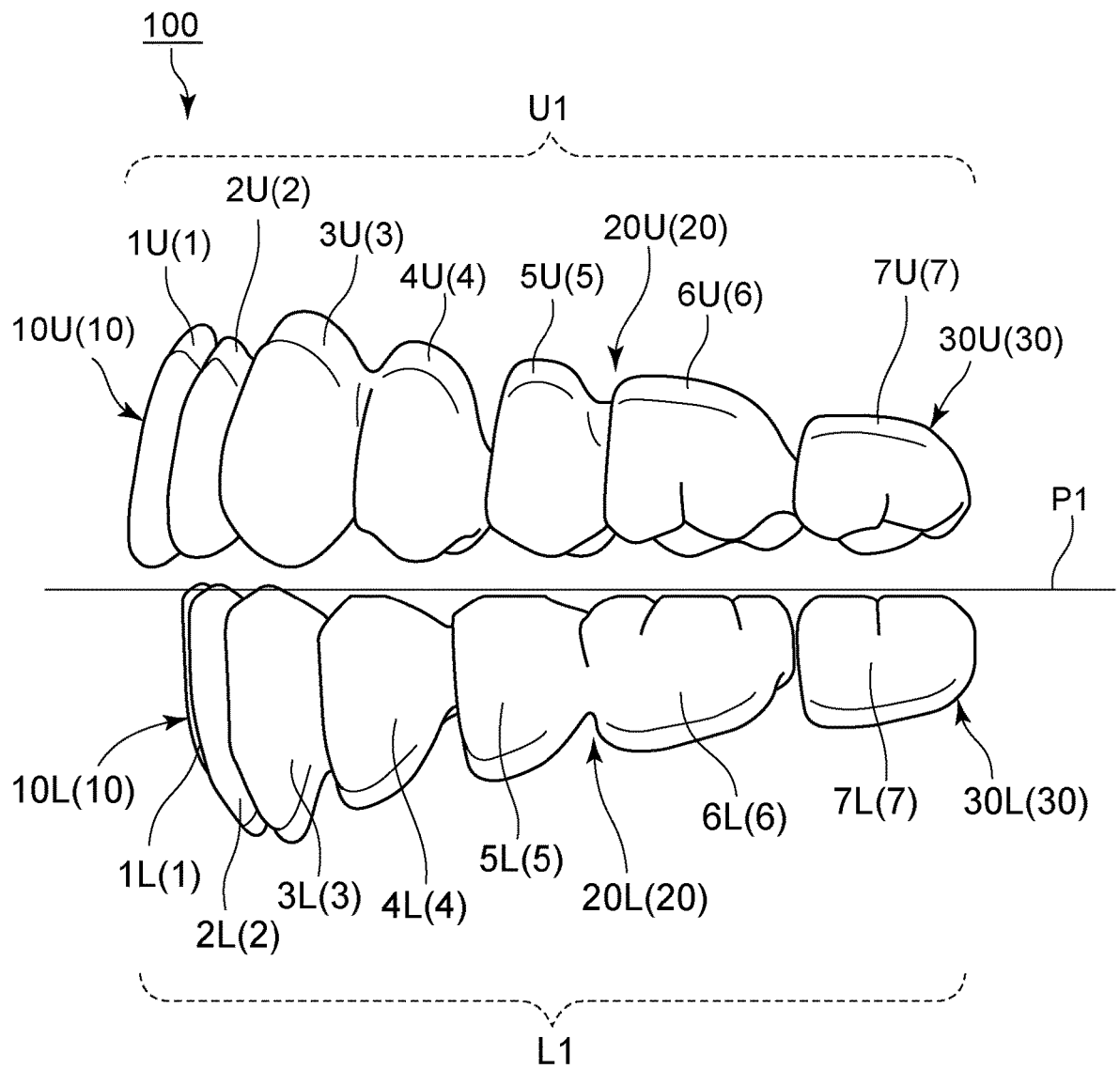
FIG. 6 is a maxillomandibular artificial tooth lateral aspect (maxillary occlusal and mandibular cuspless form).

FIG. 6 shows another example of the partial connection full arch artificial tooth 100 viewed from the side. In the example shown in FIG. 6, the first premolar 4 of the anterior tooth group artificial tooth 10 of the mandibular partial connection full arch artificial tooth L1, the second premolar 5 and the first molar 6 of the occlusal center group artificial tooth 20, and the second molar 7 of the artificial tooth 30 of the single tooth are all in a cuspless form as in the example shown in FIG. 4. The first premolar 4 of the anterior tooth group artificial tooth 10 of the maxillary partial connection full arch artificial tooth U1, the second premolar 5 and the first molar 6 of the occlusal center group artificial tooth 20, and the second molar 7 of the artificial tooth 30 of the single tooth are all in a cuspidate form as in the example shown in FIG. 5.

More specifically, in the mandibular partial connection full arch artificial tooth L1, the occlusal surface of the mandibular first premolar 4L of the mandibular anterior tooth group artificial tooth 10L, and the mandibular second premolar 5L and the mandibular first molar 6L of the mandibular occlusal center group artificial tooth 20L conforms to the virtual occlusal plane P1 of the denture. The mandibular first premolar 4L of the mandibular anterior tooth group artificial tooth 10L of the mandibular partial connection full arch artificial tooth L1, the mandibular second premolar 5L and the mandibular first molar 6L of the mandibular occlusal center group artificial tooth 20L, and the mandibular second molar 7L of the artificial tooth 30L of the mandibular single tooth are configured in a cuspless form. The maxillary first premolar 4U of the maxillary anterior tooth group artificial tooth 10U of the maxillary partial connection full arch artificial tooth U1, the maxillary second premolar 5U and the maxillary first molar 6U of the maxillary occlusal center group artificial tooth 20U, and the maxillary second molar 7U of the artificial tooth 30U of the maxillary single tooth are configured in a cuspidate form.

In order to bring the maxillary partial connection full arch artificial tooth U1 of the cuspidate form into occlusal contact in accordance with the mandibular partial connection full arch artificial tooth L1 of the cuspless form in a state of not giving anteroposterior adjustment curvature, the contact region f1 orthogonal to the virtual occlusal plane P1 of the denture may be selected between the first premolar 4 and the second premolar 5. Furthermore, the contact region f5 orthogonal to the virtual occlusal plane P1 of the denture may be selected between the first molar 6 and the second molar 7. Alternatively, as described earlier, the artificial tooth 30 of a single tooth of the second molar 7 may be selected whether to be excluded from the configuration if there is no artificial tooth arrangement space due to the shape of the ridge or if there is a concern about detachment of the denture at the time of occlusion. Thus, tapping points converge to a fixed position with progression of abrasion between the mandibular occlusal surface and the maxillary cusp in opposing contact, and therefore, it has an effect of making it easy to provide a therapeutic denture for a patient with an unstable jaw position or a patient with varied tapping points as described above.

The present invention is an invention relating to an artificial tooth, and is industrially applicable.

The invention claimed is:

1. A partial connection full arch artificial tooth having adjustability of dental arch and occlusion curvature, comprising:
   a maxillary partial connection full arch artificial tooth; and
   a mandibular partial connection full arch artificial tooth,
   wherein the maxillary partial connection full arch artificial tooth has:
      a maxillary anterior tooth group artificial tooth in which eight teeth of maxillary central incisors, maxillary lateral incisors, maxillary canines, and maxillary first premolars that are arranged on both right and left sides are connected and fixed in a center of the maxillary partial connection full arch artificial tooth, and
      a maxillary occlusal center group artificial tooth in which two teeth of a maxillary second premolar and a maxillary first molar are connected and fixed and connected to the maxillary anterior tooth group artificial tooth in each of a right side and a left side of the maxillary partial connection full arch artificial tooth,
   wherein the maxillary partial connection full arch artificial tooth is configured such that an artificial tooth of a maxillary single tooth including a maxillary second molar is connectable to the maxillary occlusal center group artificial tooth in each of a right side and a left side of the maxillary partial connection full arch artificial tooth,
   wherein the mandibular partial connection full arch artificial tooth has:
      a mandibular anterior tooth group artificial tooth in which eight teeth of mandibular central incisors, mandibular lateral incisors, mandibular canines, and mandibular first premolars that are arranged on both right and left sides are connected and fixed in a center of the mandibular partial connection full arch artificial tooth, and
      a mandibular occlusal center group artificial tooth in which two teeth of a mandibular second premolar and a mandibular first molar are connected and fixed and connected to the mandibular anterior tooth group artificial tooth in each of a right side and a left side of the mandibular partial connection full arch artificial tooth,
   wherein the mandibular partial connection full arch artificial tooth is configured such that an artificial tooth of a mandibular single tooth including a mandibular second molar is connectable to the mandibular occlusal center group artificial tooth in each of a right side and a left side of the mandibular partial connection full arch artificial tooth,
   wherein a distal surface of the maxillary first premolar is provided with a region including two pillar surfaces having different angles intersecting a virtual occlusal plane of a denture on each of an occlusal surface side and a basal surface side,
   wherein a mesial surface of the maxillary second premolar is provided with a region including a single pillar surface that is orthogonal to a plane including three points of a buccal cusp tip and a lingual cusp tip of a maxillary second premolar and a mesial lingual cusp tip of a maxillary first molar in a case of a cuspidate form, and orthogonal to an occlusal surface of the maxillary second premolar and the maxillary first molar in a case of a cuspless form,
   wherein any one of a pillar surface on an occlusal surface side and a pillar surface on a basal surface side of the distal surface of the maxillary first premolar forms a contact region in contact with a pillar surface of a mesial surface of the maxillary second premolar,
   wherein a distal surface of the mandibular first premolar is provided with a region including two pillar surfaces having different angles intersecting a virtual occlusal plane of a denture on each of an occlusal surface side and a basal surface side,
   wherein a mesial surface of the mandibular second premolar is provided with a region including a single pillar surface that is orthogonal to a plane including three points of a buccal cusp tip and a lingual cusp tip of the mandibular second premolar and a mesial lingual cusp tip of the mandibular first molar in a case of a cuspidate form, and orthogonal to an occlusal surface of the mandibular second premolar and the mandibular first molar in a case of a cuspless form, wherein any one of a pillar surface on an occlusal surface side and a pillar surface on a basal surface side of the distal surface of the mandibular first premolar forms a contact region in contact with a pillar surface of a mesial surface of the mandibular second premolar, wherein, when a first contact region is formed in the maxillary partial connection full arch artificial tooth by a pillar surface on an occlusal surface side of the distal surface of the maxillary first premolar and a pillar surface of the mesial surface of the maxillary second premolar coming into contact with each other, a second contact region is formed in the mandibular partial connection full arch artificial tooth by a pillar surface on a basal surface side of the distal surface of the mandibular first premolar and a pillar surface of a mesial surface of the mandibular second premolar coming into contact with each other, and wherein, when a third contact region is formed in the maxillary partial connection full arch artificial tooth by a pillar surface on a basal surface side of the distal surface of the maxillary first premolar and a pillar surface of the mesial surface of the maxillary second premolar coming into contact with each other, a fourth contact region is formed in the mandibular partial connection full arch artificial tooth by a pillar surface on an occlusal surface side of the distal surface of the mandibular first premolar and a pillar surface of the mesial surface of the mandibular second premolar coming into contact with each other.

2. A partial connection full arch artificial tooth according to claim 1, wherein
when the first contact region is formed in the maxillary partial connection full arch artificial tooth and the second contact region is formed in the mandibular partial connection full arch artificial tooth, each of the first contact region and the second contact region has a contact area of 0.01 mm$^2$ or more and 10.0 mm$^2$ or less and is orthogonal to a virtual occlusal plane of a denture.

3. A partial connection full arch artificial tooth according to claim 2, wherein
when the third contact region is formed in the maxillary partial connection full arch artificial tooth and the fourth contact region is formed in the mandibular partial connection full arch artificial tooth, each of the third contact region and the fourth contact region has a contact area of 0.01 mm$^2$ or more and 10.0 mm$^2$ or less and intersect at an internal angle of 70° or more and 90° or less with respect to a virtual occlusal plane of a denture.

4. A partial connection full arch artificial tooth according to claim 3, wherein:
when the artificial tooth of the maxillary single tooth is connected to the maxillary occlusal center group artificial tooth in the maxillary partial connection full arch artificial tooth and the artificial tooth of the mandibular single tooth is connected to the mandibular occlusal center group artificial tooth in the mandibular partial connection full arch artificial tooth,
a distal surface of the maxillary first molar of the maxillary occlusal center group artificial tooth is provided with a region including two pillar surfaces having different angles intersecting a virtual occlusal plane of a denture on each of an occlusal surface side and a basal surface side,
a mesial surface of the maxillary second molar is provided with a region including a single pillar surface that is orthogonal to a plane including three points of a mesial buccal cusp tip, a mesial lingual cusp tip, and a distal buccal cusp tip of the maxillary second molar in a case of a cuspidate form, and orthogonal to an occlusal surface of the maxillary second molar in a case of a cuspless form,
any one of a pillar surface on an occlusal surface side and a pillar surface on a basal surface side of the maxillary first molar forms a contact region with a pillar surface of the mesial surface of the maxillary second molar,
a distal surface of the mandibular first molar of the mandibular occlusal center group artificial tooth is provided with a region including two pillar surfaces having different angles intersecting a virtual occlusal plane of a denture on each of an occlusal surface side and a basal surface side,
a mesial surface of the mandibular second molar is provided with a region including a single pillar surface that is orthogonal to a plane including three points of a mesial buccal cusp tip, a mesial lingual cusp tip, and a distal buccal cusp tip of the mandibular second molar in a case of a cuspidate form, and orthogonal to an occlusal surface of the mandibular second molar in a case of a cuspless form,
any one of a pillar surface on an occlusal surface side and a pillar surface on a basal surface side of the mandibular first molar forms a contact region with a pillar surface of the mesial surface of the mandibular second molar,
when a fifth contact region is formed in the maxillary partial connection full arch artificial tooth by a pillar surface on an occlusal surface side of the distal surface of the maxillary first molar and a pillar surface of the mesial surface of the maxillary second molar coming into contact with each other, a sixth contact region is formed in the mandibular partial connection full arch artificial tooth by a pillar surface on a basal surface side of the distal surface of the mandibular first molar and a pillar surface of a mesial surface of the mandibular second molar coming into contact with each other, and
when a seventh contact region is formed in the maxillary partial connection full arch artificial tooth by a pillar surface on a basal surface side of the distal surface of the maxillary first molar and a pillar surface of the mesial surface of the maxillary second molar coming into contact with each other, an eighth contact region is formed in the mandibular partial connection full arch artificial tooth by a pillar surface on an occlusal surface side of the distal surface of the mandibular first molar and a pillar surface of the mesial surface of the mandibular second molar coming into contact with each other.

5. A partial connection full arch artificial tooth according to claim 4, wherein
when the fifth contact region is formed in the maxillary partial connection full arch artificial tooth and the sixth contact region is formed in the mandibular partial connection full arch artificial tooth, each of the fifth contact region and the sixth contact region has a contact area of 0.01 mm$^2$ or more and 10.0 mm$^2$ or less and is orthogonal to a virtual occlusal plane of a denture.

6. A partial connection full arch artificial tooth according to claim 2, wherein:
when the artificial tooth of the maxillary single tooth is connected to the maxillary occlusal center group artificial tooth in the maxillary partial connection full arch artificial tooth and the artificial tooth of the mandibular single tooth is connected to the mandibular occlusal center group artificial tooth in the mandibular partial connection full arch artificial tooth,
a distal surface of the maxillary first molar of the maxillary occlusal center group artificial tooth is provided with a region including two pillar surfaces having different angles intersecting a virtual occlusal plane of a denture on each of an occlusal surface side and a basal surface side,
a mesial surface of the maxillary second molar is provided with a region including a single pillar surface that is orthogonal to a plane including three points of a mesial buccal cusp tip, a mesial lingual cusp tip, and a distal buccal cusp tip of the maxillary second molar in a case of a cuspidate form, and orthogonal to an occlusal surface of the maxillary second molar in a case of a cuspless form,
any one of a pillar surface on an occlusal surface side and a pillar surface on a basal surface side of the maxillary first molar forms a contact region with a pillar surface of the mesial surface of the maxillary second molar,
a distal surface of the mandibular first molar of the mandibular occlusal center group artificial tooth is provided with a region including two pillar surfaces having different angles intersecting a virtual occlusal plane of a denture on each of an occlusal surface side and a basal surface side,
a mesial surface of the mandibular second molar is provided with a region including a single pillar surface that is orthogonal to a plane including three points of a mesial buccal cusp tip, a mesial lingual cusp tip, and a distal buccal cusp tip of the mandibular second molar in a case of a cuspidate form, and orthogonal to an occlusal surface of the mandibular second molar in a case of a cuspless form,
any one of a pillar surface on an occlusal surface side and a pillar surface on a basal surface side of the mandibular first molar forms a contact region with a pillar surface of the mesial surface of the mandibular second molar,
when a fifth contact region is formed in the maxillary partial connection full arch artificial tooth by a pillar surface on an occlusal surface side of the distal surface of the maxillary first molar and a pillar surface of the mesial surface of the maxillary second molar coming into contact with each other, a sixth contact region is formed in the mandibular partial connection full arch artificial tooth by a pillar surface on a basal surface side of the distal surface of the mandibular first molar and a pillar surface of a mesial surface of the mandibular second molar coming into contact with each other, and
when a seventh contact region is formed in the maxillary partial connection full arch artificial tooth by a pillar surface on a basal surface side of the distal surface of the maxillary first molar and a pillar surface of the mesial surface of the maxillary second molar coming into contact with each other, an eighth contact region is formed in the mandibular partial connection full arch artificial tooth by a pillar surface on an occlusal surface side of the distal surface of the mandibular first molar and a pillar surface of the mesial surface of the mandibular second molar coming into contact with each other.

7. A partial connection full arch artificial tooth according to claim 6, wherein
when the fifth contact region is formed in the maxillary partial connection full arch artificial tooth and the sixth contact region is formed in the mandibular partial connection full arch artificial tooth, each of the fifth contact region and the sixth contact region has a contact area of 0.01 mm$^2$ or more and 10.0 mm$^2$ or less and is orthogonal to a virtual occlusal plane of a denture.

8. A partial connection full arch artificial tooth according to claim 2, wherein:
in the mandibular partial connection full arch artificial tooth, an occlusal surface of the mandibular first premolar of the mandibular anterior tooth group artificial tooth, and the mandibular second premolar and the mandibular first molar of the mandibular occlusal center group artificial tooth conforms to a virtual occlusal plane of a denture,
the maxillary canine of the maxillary anterior tooth group artificial tooth of the maxillary partial connection full arch artificial tooth includes a maxillary occlusal facet that is parallel to a virtual occlusal plane of a denture at a cusp,
the maxillary first premolar of the maxillary anterior tooth group artificial tooth, the maxillary second premolar and the maxillary first molar of the maxillary occlusal center group artificial tooth, and the maxillary second molar of an artificial tooth of the maxillary single tooth are configured in a cuspless form,
the mandibular canine of the mandibular anterior tooth group artificial tooth of the mandibular partial connection full arch artificial tooth includes a mandibular occlusal facet that is parallel to a virtual occlusal plane of a denture at a cusp, and
the mandibular first premolar of the mandibular anterior tooth group artificial tooth, the mandibular second premolar and the mandibular first molar of the mandibular occlusal center group artificial tooth, and the mandibular second molar of an artificial tooth of the mandibular single tooth are configured in a cuspless form.

9. The partial connection full arch artificial tooth according to claim 2, wherein:
the maxillary first premolar of the maxillary anterior tooth group artificial tooth of the maxillary partial connection full arch artificial tooth, the maxillary second premolar and the maxillary first molar of the maxillary occlusal center group artificial tooth, and the maxillary second molar of an artificial tooth of the maxillary single tooth are configured in a cuspidate form, and
the mandibular first premolar of the mandibular anterior tooth group artificial tooth of the mandibular partial connection full arch artificial tooth, the mandibular second premolar and the mandibular first molar of the mandibular occlusal center group artificial tooth, and the mandibular second molar of an artificial tooth of the mandibular single tooth are configured in a cuspidate form.

10. A partial connection full arch artificial tooth according to claim 2, wherein:
in the mandibular partial connection full arch artificial tooth, an occlusal surface of the mandibular first premolar of the mandibular anterior tooth group artificial tooth, and the mandibular second premolar and the mandibular first molar of the mandibular occlusal center group artificial tooth conforms to a virtual occlusal plane of a denture, the mandibular first premolar of the mandibular anterior tooth group artificial tooth of the mandibular partial connection full arch artificial tooth, the mandibular second premolar and the mandibular first molar of the mandibular occlusal center group artificial tooth, and the mandibular second molar of an artificial tooth of the mandibular single tooth are configured in a cuspless form, and the maxillary first premolar of the maxillary anterior tooth group artificial tooth of the maxillary partial connection full arch artificial tooth, the maxillary second premolar and the maxillary first molar of the maxillary occlusal center group artificial tooth, and the maxillary second molar of an artificial tooth of the maxillary single tooth are configured in a cuspidate form.

11. A partial connection full arch artificial tooth according to claim 1, wherein when the third contact region is formed in the maxillary partial connection full arch artificial tooth and the fourth contact region is formed in the mandibular partial connection full arch artificial tooth, each of the third contact region and the fourth contact region has a contact area of 0.01 mm² or more and 10.0 mm² or less and intersect at an internal angle of 70° or more and 90° or less with respect to a virtual occlusal plane of a denture.

12. A partial connection full arch artificial tooth according to claim 11, wherein:

when the artificial tooth of the maxillary single tooth is connected to the maxillary occlusal center group artificial tooth in the maxillary partial connection full arch artificial tooth and the artificial tooth of the mandibular single tooth is connected to the mandibular occlusal center group artificial tooth in the mandibular partial connection full arch artificial tooth, a distal surface of the maxillary first molar of the maxillary occlusal center group artificial tooth is provided with a region including two pillar surfaces having different angles intersecting a virtual occlusal plane of a denture on each of an occlusal surface side and a basal surface side, a mesial surface of the maxillary second molar is provided with a region including a single pillar surface that is orthogonal to a plane including three points of a mesial buccal cusp tip, a mesial lingual cusp tip, and a distal buccal cusp tip of the maxillary second molar in a case of a cuspidate form, and orthogonal to an occlusal surface of the maxillary second molar in a case of a cuspless form, any one of a pillar surface on an occlusal surface side and a pillar surface on a basal surface side of the maxillary first molar forms a contact region with a pillar surface of the mesial surface of the maxillary second molar, a distal surface of the mandibular first molar of the mandibular occlusal center group artificial tooth is provided with a region including two pillar surfaces having different angles intersecting a virtual occlusal plane of a denture on each of an occlusal surface side and a basal surface side, a mesial surface of the mandibular second molar is provided with a region including a single pillar surface that is orthogonal to a plane including three points of a mesial buccal cusp tip, a mesial lingual cusp tip, and a distal buccal cusp tip of the mandibular second molar in a case of a cuspidate form, and orthogonal to an occlusal surface of the mandibular second molar in a case of a cuspless form, any one of a pillar surface on an occlusal surface side and a pillar surface on a basal surface side of the mandibular first molar forms a contact region with a pillar surface of the mesial surface of the mandibular second molar, when a fifth contact region is formed in the maxillary partial connection full arch artificial tooth by a pillar surface on an occlusal surface side of the distal surface of the maxillary first molar and a pillar surface of the mesial surface of the maxillary second molar coming into contact with each other, a sixth contact region is formed in the mandibular partial connection full arch artificial tooth by a pillar surface on a basal surface side of the distal surface of the mandibular first molar and a pillar surface of a mesial surface of the mandibular second molar coming into contact with each other, and when a seventh contact region is formed in the maxillary partial connection full arch artificial tooth by a pillar surface on a basal surface side of the distal surface of the maxillary first molar and a pillar surface of the mesial surface of the maxillary second molar coming into contact with each other, an eighth contact region is formed in the mandibular partial connection full arch artificial tooth by a pillar surface on an occlusal surface side of the distal surface of the mandibular first molar and a pillar surface of the mesial surface of the mandibular second molar coming into contact with each other.

13. A partial connection full arch artificial tooth according to claim 12, wherein when the fifth contact region is formed in the maxillary partial connection full arch artificial tooth and the sixth contact region is formed in the mandibular partial connection full arch artificial tooth, each of the fifth contact region and the sixth contact region has a contact area of 0.01 mm² or more and 10.0 mm² or less and is orthogonal to a virtual occlusal plane of a denture.

14. A partial connection full arch artificial tooth according to claim 1, wherein:

when the artificial tooth of the maxillary single tooth is connected to the maxillary occlusal center group artificial tooth in the maxillary partial connection full arch artificial tooth and the artificial tooth of the mandibular single tooth is connected to the mandibular occlusal center group artificial tooth in the mandibular partial connection full arch artificial tooth, a distal surface of the maxillary first molar of the maxillary occlusal center group artificial tooth is provided with a region including two pillar surfaces having different angles intersecting a virtual occlusal plane of a denture on each of an occlusal surface side and a basal surface side, a mesial surface of the maxillary second molar is provided with a region including a single pillar surface that is orthogonal to a plane including three points of a mesial buccal cusp tip, a mesial lingual cusp tip, and a distal buccal cusp tip of the maxillary second molar in a case of a cuspidate form, and orthogonal to an occlusal surface of the maxillary second molar in a case of a cuspless form, any one of a pillar surface on an occlusal surface side and a pillar surface on a basal surface side of the maxillary first molar forms a contact region with a pillar surface of the mesial surface of the maxillary second molar, a distal surface of the mandibular first molar of the mandibular occlusal center group artificial tooth is provided with a region including two pillar surfaces having different angles intersecting a virtual occlusal plane of a denture on each of an occlusal surface side and a basal surface side, a mesial surface of the mandibular second molar is provided with a region including a single pillar surface that is orthogonal to a plane including three points of a mesial buccal cusp tip, a mesial lingual cusp tip, and a distal buccal cusp tip of the mandibular second molar in a case of a cuspidate form, and orthogonal to an occlusal surface of the mandibular second molar in a case of a cuspless form, any one of a pillar surface on an occlusal surface side and a pillar surface on a basal surface side of the mandibular first molar forms a contact region with a pillar surface of the mesial surface of the mandibular second molar, when a fifth contact region is formed in the maxillary partial connection full arch artificial tooth by a pillar surface on an occlusal surface side of the distal surface of the maxillary first molar and a pillar surface of the mesial surface of the maxillary second molar coming into contact with each other, a sixth contact region is formed in the mandibular partial connection full arch artificial tooth by a pillar surface on a basal surface side of the distal surface of the mandibular first molar and a pillar surface of a mesial surface of the mandibular second molar coming into contact with each other, and when a seventh contact region is formed in the maxillary partial connection full arch artificial tooth by a pillar surface on a basal surface side of the distal surface of the maxillary first molar and a pillar surface of the mesial surface of the maxillary second molar coming into contact with each other, an eighth contact region is formed in the mandibular partial connection full arch artificial tooth by a pillar surface on an occlusal surface side of the distal surface of the mandibular first molar and a pillar surface of the mesial surface of the mandibular second molar coming into contact with each other.

15. A partial connection full arch artificial tooth according to claim 14, wherein when the fifth contact region is formed in the maxillary partial connection full arch artificial tooth and the sixth contact region is formed in the mandibular partial connection full arch artificial tooth, each of the fifth contact region and the sixth contact region has a contact area of 0.01 mm$^2$ or more and 10.0 mm$^2$ or less and is orthogonal to a virtual occlusal plane of a denture.

16. A partial connection full arch artificial tooth according to claim 15, wherein when the seventh contact region is formed in the maxillary partial connection full arch artificial tooth and the eighth contact region is formed in the mandibular partial connection full arch artificial tooth, each of the seventh contact region and the eighth contact region has a contact area of 0.01 mm$^2$ or more and 10.0 mm$^2$ or less and intersect at an internal angle of 40° or more and 90° or less with respect to a virtual occlusal plane of a denture.

17. A partial connection full arch artificial tooth according to claim 14, wherein when the seventh contact region is formed in the maxillary partial connection full arch artificial tooth and the eighth contact region is formed in the mandibular partial connection full arch artificial tooth, each of the seventh contact region and the eighth contact region has a contact area of 0.01 mm$^2$ or more and 10.0 mm$^2$ or less and intersect at an internal angle of 40° or more and 90° or less with respect to a virtual occlusal plane of a denture.

18. A partial connection full arch artificial tooth according to claim 1, wherein:

in the mandibular partial connection full arch artificial tooth, an occlusal surface of the mandibular first premolar of the mandibular anterior tooth group artificial tooth, and the mandibular second premolar and the mandibular first molar of the mandibular occlusal center group artificial tooth conforms to a virtual occlusal plane of a denture, the maxillary canine of the maxillary anterior tooth group artificial tooth of the maxillary partial connection full arch artificial tooth includes a maxillary occlusal facet that is parallel to a virtual occlusal plane of a denture at a cusp, the maxillary first premolar of the maxillary anterior tooth group artificial tooth, the maxillary second premolar and the maxillary first molar of the maxillary occlusal center group artificial tooth, and the maxillary second molar of an artificial tooth of the maxillary single tooth are configured in a cuspless form, the mandibular canine of the mandibular anterior tooth group artificial tooth of the mandibular partial connection full arch artificial tooth includes a mandibular occlusal facet that is parallel to a virtual occlusal plane of a denture at a cusp, and the mandibular first premolar of the mandibular anterior tooth group artificial tooth, the mandibular second premolar and the mandibular first molar of the mandibular occlusal center group artificial tooth, and the mandibular second molar of an artificial tooth of the mandibular single tooth are configured in a cuspless form.

19. The partial connection full arch artificial tooth according to claim 1, wherein:

the maxillary first premolar of the maxillary anterior tooth group artificial tooth of the maxillary partial connection full arch artificial tooth, the maxillary second premolar and the maxillary first molar of the maxillary occlusal center group artificial tooth, and the maxillary second molar of an artificial tooth of the maxillary single tooth are configured in a cuspidate form, and the mandibular first premolar of the mandibular anterior tooth group artificial tooth of the mandibular partial connection full arch artificial tooth, the mandibular second premolar and the mandibular first molar of the mandibular occlusal center group artificial tooth, and the mandibular second molar of an artificial tooth of the mandibular single tooth are configured in a cuspidate form.

20. A partial connection full arch artificial tooth according to claim 1, wherein:

in the mandibular partial connection full arch artificial tooth, an occlusal surface of the mandibular first premolar of the mandibular anterior tooth group artificial tooth, and the mandibular second premolar and the mandibular first molar of the mandibular occlusal center group artificial tooth conforms to a virtual occlusal plane of a denture, the mandibular first premolar of the mandibular anterior tooth group artificial tooth of the mandibular partial connection full arch artificial tooth, the mandibular second premolar and the mandibular first molar of the mandibular occlusal center group artificial tooth, and the mandibular second molar of an artificial tooth of the mandibular single tooth are configured in a cuspless form, and the maxillary first premolar of the maxillary anterior tooth group artificial tooth of the maxillary partial connection full arch artificial tooth, the maxillary second premolar and the maxillary first molar of the maxillary occlusal center group artificial tooth, and the maxillary second molar of an artificial tooth of the maxillary single tooth are configured in a cuspidate form.

* * * * *